United States Patent
Ichimaru et al.

(10) Patent No.: US 8,763,656 B2
(45) Date of Patent: Jul. 1, 2014

(54) DEVICE FOR PREVENTING FUELING ERROR

(75) Inventors: Takahide Ichimaru, Chigasaki (JP); Yuki Takikawa, Fujisawa (JP); Syouichi Hokazono, Wako (JP); Takeaki Nakajima, Wako (JP); Shinya Murabayashi, Wako (JP)

(73) Assignees: Nifco Inc., Yokohama-shi (JP); Honda Motor Co., Ltd., Tokyo (JP)

( * ) Notice: Subject to any disclaimer, the term of this patent is extended or adjusted under 35 U.S.C. 154(b) by 645 days.

(21) Appl. No.: 12/737,854

(22) PCT Filed: Jul. 14, 2009

(86) PCT No.: PCT/JP2009/003288
§ 371 (c)(1),
(2), (4) Date: Apr. 22, 2011

(87) PCT Pub. No.: WO2010/023810
PCT Pub. Date: Mar. 4, 2010

(65) Prior Publication Data
US 2011/0214783 A1 Sep. 8, 2011

(30) Foreign Application Priority Data

Aug. 25, 2008 (JP) .................................. 2008-215417
Dec. 26, 2008 (JP) .................................. 2008-332013

(51) Int. Cl.
*B60K 15/04* (2006.01)
(52) U.S. Cl.
USPC .......................................... 141/350; 220/86.2
(58) Field of Classification Search
USPC ................... 141/348–350; 220/86.2
See application file for complete search history.

(56) References Cited

U.S. PATENT DOCUMENTS

| 6,382,270 | B1 * | 5/2002 | Gzik ............................... 141/94 |
| 7,077,178 | B2 * | 7/2006 | Hedevang ...................... 141/367 |
| 7,182,111 | B2 * | 2/2007 | McClung et al. .............. 141/352 |
| 7,293,586 | B2 * | 11/2007 | Groom et al. .................. 141/350 |
| 7,302,977 | B2 * | 12/2007 | King et al. ...................... 141/367 |
| 7,464,736 | B2 * | 12/2008 | Jones et al. .................... 141/350 |
| 7,621,303 | B2 * | 11/2009 | Buchgraber ................... 141/350 |
| 7,661,550 | B2 * | 2/2010 | Feichtinger ................. 220/86.2 |
| 7,665,493 | B2 * | 2/2010 | Groom et al. .................. 141/350 |
| 7,789,113 | B2 * | 9/2010 | Stephan et al. ............... 141/350 |
| 7,967,041 | B2 * | 6/2011 | Groom et al. .................. 141/367 |
| 7,967,042 | B2 * | 6/2011 | Groom et al. .................. 141/367 |

(Continued)

FOREIGN PATENT DOCUMENTS

| DE | 10 2005 047 459 | 8/2006 |
| EP | 1 319 545 | 6/2003 |

(Continued)

*Primary Examiner* — Gregory Huson
*Assistant Examiner* — Nicolas A Arnett
(74) *Attorney, Agent, or Firm* — Manabu Kanesaka

(57) ABSTRACT

A device for preventing a fueling error reliably prevents a fueling error by accurately preventing an insertion of a small-diameter nozzle without blocking an insertion of a large-diameter nozzle whose entrance should be permitted. Even if an end of a nozzle is strongly pressed to left-and-right shutter members (22), the shutter members (22) never rotate and move in an opening direction unless the shutter members (22) slide and move to an outside of a radial direction. Thus, the structure prevents the shutter members (22) from erroneously moving to a position in which the nozzle is allowed to enter from a blocking position.

14 Claims, 19 Drawing Sheets

(56) References Cited

U.S. PATENT DOCUMENTS

| | | | |
|---|---|---|---|
| 2002/0020465 A1* | 2/2002 | Gzik | 141/390 |
| 2006/0032549 A1* | 2/2006 | McClung et al. | 141/97 |
| 2006/0032552 A1* | 2/2006 | Hedevang | 141/367 |
| 2006/0096662 A1* | 5/2006 | King et al. | 141/367 |
| 2006/0289084 A1* | 12/2006 | Groom et al. | 141/367 |
| 2007/0034287 A1* | 2/2007 | Groom et al. | 141/350 |
| 2008/0271816 A1 | 11/2008 | Gerdes | |
| 2009/0020182 A1* | 1/2009 | Groom et al. | 141/349 |
| 2010/0006178 A1 | 1/2010 | Muth et al. | |
| 2010/0132838 A1* | 6/2010 | Cisternino et al. | 141/349 |
| 2010/0175785 A1* | 7/2010 | Groom et al. | 141/350 |
| 2011/0162754 A1* | 7/2011 | Murabayashi et al. | 141/286 |

FOREIGN PATENT DOCUMENTS

| | | | | |
|---|---|---|---|---|
| GB | 2 431 634 | | 5/2007 | |
| JP | 2008-049952 | | 3/2008 | |
| WO | WO 2007/012488 | * | 2/2007 | B60K 15/04 |

\* cited by examiner

DEVICE FOR PREVENTING FUELING ERROR

FIELD OF TECHNOLOGY

The invention relates to a device for preventing a fueling error, especially a device for preventing a fueling error of gasoline and light oil by using a difference in nozzle bore diameters of fueling guns.

BACKGROUND ART

In Europe and the like, as for the fueling guns in a fueling station such as a gas station and the like, a fueling gun for gasoline which fuels gasoline and, a fueling gun for light oil which fuels light oil for a diesel-powered car, have different nozzle bore diameters, and the nozzle bore diameter of the fueling gun for light oil is larger than the nozzle bore diameter of the fueling gun for gasoline.

In a vehicle such as an automobile and the like, an inside diameter of a filler pipe, communicating with an in-vehicle fuel tank, where a nozzle of the fueling gun is inserted, is set in a size, as for a gasoline vehicle, such that a small-diameter nozzle of the fueling gun for gasoline can be inserted, but a large-diameter nozzle of the fueling gun for light oil cannot be inserted. Accordingly, the fueling error of the light oil relative to the gasoline vehicle can be prevented. However, in this inside diameter setting for the filler pipe, the fueling error of gasoline relative to the diesel-powered car cannot be prevented.

In response to this, a device for preventing a fueling error for the diesel-powered car incorporated in the filler pipe has been developed (for example, Patent Documents 1, 2). This device for preventing the fueling error comprises a shutter member (blocking member) which rotates and is displaced between a nozzle entrance-preventing position rotatably provided for preventing entry of the nozzle and a nozzle entrance-permitting position permitting the entry of the nozzle. The shutter member includes an operating portion abutting against the large-diameter nozzle and rotating the shutter member to the nozzle entrance-permitting position.

In this device for preventing the fueling error, due to a difference of the nozzle bore diameters of the fueling guns, the operating portion of the shutter member does not operate relative to the small-diameter nozzle, and the shutter member maintains the nozzle entrance-preventing position. Also, the operating portion of the shutter member operates relative to the large-diameter nozzle, and the shutter member rotates to the nozzle entrance-permitting position from the nozzle entrance-preventing position so as to allow only, an insertion of the large-diameter nozzle and permit only fueling of the light oil. Under this operation, the fueling error can be prevented.

PRIOR ART DOCUMENT

Patent Document

Patent Document 1: German Patent Application Laid-Open Publication No. 10157090 Specification (DE 10157090C1)

Patent Document 2: German Utility Model Application Laid-Open Publication No. 202005014387 Specification (DE 2020050143871U1)

SUMMARY OF THE INVENTION

Problems to be Solved by the Invention

In the above-mentioned conventional device for preventing the fueling error, since the shutter member moves from the nozzle entrance-preventing position to nozzle entrance-permitting position only by a rotational displacement (swivel) around one axis line, there is a problem that if the small-diameter nozzle strongly hits a nozzle entrance-shielding portion of the shutter member where a nozzle end hits, the shutter member may rotate from the nozzle entrance-preventing position to the nozzle entrance-permitting position by error.

In order to avoid this error operation, a projecting portion entered into an inside of the small-diameter nozzle is required to be provided in the nozzle entrance-shielding portion. This projecting portion prevents the shutter member from being pushed open by an engagement of a nozzle inside diameter portion, and is useful in order to avoid the fueling error by the small-diameter nozzle.

However, on the negative side, even at a time of an insertion of the large-diameter nozzle, there is a problem that the projecting portion may be caught on an end of the large-diameter nozzle, and the insertion of the large-diameter nozzle whose entrance should be permitted may be blocked.

Also, if the device for preventing the fueling error has a structure in which the shutter member moves from the nozzle entrance-preventing position to the nozzle entrance-permitting position only by the rotational displacement (swivel) around one axis line, there is a problem that if the small-diameter nozzle is inserted in a state of being slanted to one side, or the small-diameter nozzle is inserted obliquely, the shutter member may rotate from the nozzle entrance-preventing position to the nozzle entrance-permitting position by error.

Problems in which the present invention attempts to solve are that without blocking the insertion of the large-diameter nozzle whose entrance should be permitted, the insertion of the small-diameter nozzle is accurately prevented, and an assured prevention of the fueling error is carried out.

Means for Solving the Problems

A device for preventing a fueling error according to the present invention permits an insertion of a large-diameter nozzle relative to a nozzle insertion passage and blocks an insertion of a small-diameter nozzle relative to the above-mentioned nozzle insertion passage by using a difference in nozzle bore diameters depending on a fuel type for fueling of fueling guns which carry out the fueling relative to a fuel case. The device for preventing the fueling error comprises a shutter member which can slide and move in a radial direction of the above-mentioned nozzle insertion passage, and also can rotate, and due to the sliding movement and the rotation, moves between a blocking position blocking an insertion of a nozzle relative to the above-mentioned nozzle insertion passage and a permitting position permitting the insertion of the nozzle relative to the above-mentioned nozzle insertion passage. The above-mentioned shutter member includes a first abutting portion allowing the shutter member at least to slide and move by abutment of the nozzle whose nozzle bore diameter is a predetermined value or above, and a second abutting portion allowing the shutter member to rotate up to the above-mentioned permitting position by the abutment of the nozzle, sequentially in a nozzle insertion direction relative to the above-mentioned nozzle insertion passage. Only in a case when a nozzle whose outside diameter is the predetermined value or above is inserted into the above-mentioned nozzle insertion passage, the nozzle abuts against the above-mentioned first abutting portion and the above-mentioned second abutting portion sequentially, so that after the above-mentioned shutter member sides and moves for a predetermined amount to an outside of the radial direction of the above-mentioned nozzle insertion passage, the shutter member rotates and moves in an opening direction, and moves from the above-mentioned blocking position to the above-mentioned permitting position.

Thereby, only in the case when the nozzle whose outside diameter is the predetermined value or above is inserted into the nozzle insertion passage, the shutter member moves to the permitting position permitting the insertion of the nozzle. In a case when the nozzle outside diameter is less than the predetermined value, even if a nozzle end directly and strongly hits the shutter member, the shutter member never rotates and moves in the opening direction, and never moves from the blocking position to the permitting position.

In the device for preventing the fueling error according to the present invention, preferably the above-mentioned shutter member is rotatably supported to a member defining the above-mentioned nozzle insertion passage by an axis member, and a bearing bore where the above-mentioned axis member engages is a long bore long in the radial direction of the above-mentioned nozzle insertion passage.

Thereby, a structure supporting the shutter member so as to be capable of sliding and moving in the radial direction of the nozzle insertion passage and also capable of rotating, can be structured by a simple structure.

The device for preventing the fueling error according to the present invention, preferably further includes biasing means biasing the above-mentioned shutter member toward the above-mentioned blocking position.

Thereby, a steady position of the shutter member comes to the blocking position forcibly, and the shutter member never unnecessarily wobbles and moves to the permitting position.

In the device for preventing, the fueling error according to the present invention, preferably the above-mentioned shutter member includes a stopper portion which prohibits the rotation of the shutter member in the opening direction up to the time when the above-mentioned shutter member slides and moves to the outside of the radial direction of the nozzle insertion passage for a predetermined amount from a state of being in the above-mentioned blocking position. Also, the stopper portion prevents the movement of the above-mentioned shielding portion of the shutter member to the above-mentioned permitting position.

Thereby, the shutter member can rotate and move in the opening direction only after the shutter member slides and moves for the predetermined amount to the outside of the radial direction of the nozzle insertion passage, and as long as the shutter, member does not slide and move at first, the shutter member never moves to the permitting position.

In the device for preventing the fueling error according to the present invention, preferably the above-mentioned shutter member includes the stopper portion which prohibits the sliding movement of the shutter member in the case when the shutter member rotates in the opening direction without sliding and moving to the outside of the radial direction of the above-mentioned nozzle insertion passage from the state of being in the above-mentioned blocking position. Also, the stopper portion prevents the movement of the shutter member to the above-mentioned permitting position.

Thereby, the shutter member never moves to permitting position if the shutter member does not rotate and move in the opening direction after it slides and moves to the outside of the radial direction of the nozzle insertion passage.

In the device for preventing the fueling error according to the present invention, preferably in order to avoid breakage of the above-mentioned shutter member, in an abutting portion between the above-mentioned shutter member and the above-mentioned stopper portion, a projecting portion which plastically deforms by a predetermined pressing load or above may be formed.

In the device for preventing the fueling error according to the present invention, preferably the above-mentioned stopper portion is formed in the above-mentioned shutter member and a member supporting the shutter member, and is structured by a locking portion mutually engaging with a barrier surface blocking a sliding movement direction of the above-mentioned shutter member.

Thereby, the sliding movement of the shutter member is reliably inhibited.

In the device for preventing the fueling error according to the present invention, preferably the shutter member is further provided rotatably in a closing direction which is a direction opposite to the above-mentioned opening direction in the state of being in the above-mentioned blocking position, and due to the abutment between the nozzle whose outside diameter is the predetermined value or above and the above-mentioned first abutting portion, the rotation in the above-mentioned closing direction and sliding movement the outside of radial direction of above-mentioned nozzle insertion passage are carried out.

Thereby, the case when the nozzle whose outside diameter is the predetermined value or above is inserted, the stopper portion prohibiting the sliding movement of the shutter member is reliably assured not to carry out a stopper operation.

In the device for preventing the fueling error according to the present invention, preferably the above-mentioned shutter member forms an abutting avoidance portion which recedes to the outside of the radial direction of the above-mentioned nozzle insertion passage so as to avoid the abutment against the nozzle which is inserted obliquely in such a way as to be inclined relative to a central axis line of the above-mentioned nozzle insertion passage.

Thereby, in the case when the nozzle is inserted obliquely, the shutter member is prevented from being pushed open.

In the device for preventing the fueling error according to the present invention, preferably the above-mentioned two shutter members are symmetrically disposed on both sides across a central portion of the above-mentioned nozzle insertion passage.

Thereby, at a time of non-insertion of the nozzle, the nozzle insertion passage can be completely shielded by the shielding portion which is in the blocking position, and infiltration of dust can be prevented. Also, even if the small-diameter nozzle is inserted with a slant or inserted obliquely, a function of making an error operation difficult improves.

Effect of the Invention

According to the device for preventing the fueling error according to the present invention, even if the nozzle end strongly hits the shutter member, as long as the shutter member does not slide and move to the outside of the radial direction, the shutter member never rotates and moves in the opening direction, and never moves from a shielding position to the permitting position by error, so that without blocking the insertion of the large-diameter nozzle whose entrance should be permitted, the insertion of the small-diameter nozzle is accurately prevented, and an assured prevention of the fueling error is carried out.

BEST MODES OF CARRYING OUT THE INVENTION

Embodiment 1

Figure 1:
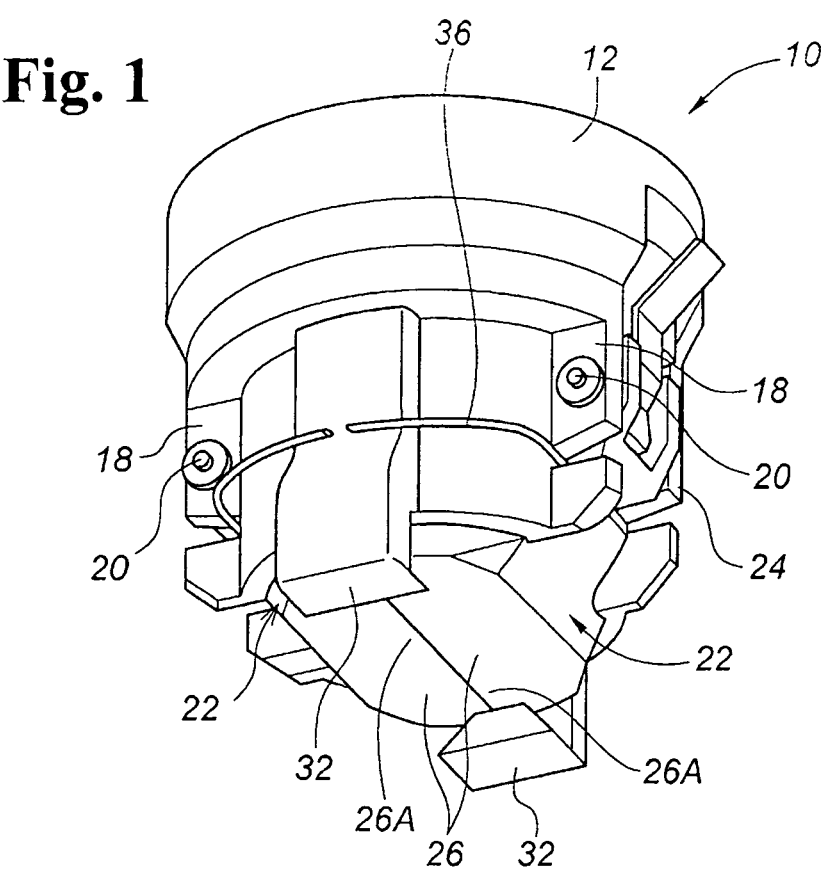
FIG. 1 is a perspective view showing an embodiment 1 of a device for preventing a fueling error according to the present invention.

An embodiment 1 of a device for preventing a fueling error according to the present invention will be explained with reference to FIGS. 1 to 10.

A device for preventing a fueling error 10 of the present embodiment is constituted as one assembly, and disposed near a fuel opening 102 of a cap-type filler pipe 100 communicating with a fuel tank of an automobile. The device for preventing the fueling error 10 includes an approximately cylindrical housing 12 which is constituted by a synthetic resin molding product. The housing 12 is fixed and disposed near the fuel opening 102 of the cap-type filler pipe 100. A tapered entrance portion 14 with an upwardly expanded diameter, and a nozzle insertion passage 16 by a straight bore continued to a small-diameter end of the tapered entrance portion 14, are formed so as to pass through in an up and down direction. In other words, the nozzle insertion passage 16 is fixed by the housing 12.

On an outer circumference of the housing 12, two right-and-left bearing bracket portions 18 are formed on both right and left sides (180 degrees rotational displacement position) across a central portion of the nozzle insertion passage 16. The two right-and-left bearing bracket portions 18 respectively support axis members 20 on an axis line parallel to a radius line (tangent line) of the nozzle insertion passage 16. The right-and-left axis members 20 attached to the right-and-left bearing bracket portions 18 are extended mutually in parallel.

The housing 12 supports a pair of right-and-left shutter members 22 by the right-and-left axis members 20. The right-and-left shutter members 22 are synthetic resin molding products with the mutually same shape, and symmetrically disposed on both the right and left sides across the central portion of the nozzle insertion passage 16.

The right-and-left shutter members 22 include arm portions 24 extending in the same, direction with an axis line direction (up and down direction) of the nozzle insertion passage 16, and approximately semicircular plate-like and approximately horizontal shielding portions 26 integrally formed in lower end portions of the arm portions 24. The shielding portions 26 are located in an exit portion (lower end portion) of the nozzle insertion passage 16, and extend inwardly in a radial direction of the nozzle insertion passage 16. Incidentally, the above-mentioned arm portions 24 and shielding portions 26 are located in a state as in the after-mentioned blocking position.

Near upper ends of the arm portions 24 of the right-and-left shutter members 22, bearing bores 30 by long bores which are long in the radial direction of the nozzle insertion passage 16 are passed through and formed. In the bearing bores 30, the axis members 20 pass through and engage. Thereby, the right-and-left shutter members 22 are respectively supported from the housing 12 so as to be capable of sliding and moving in the radial direction of the nozzle insertion passage 16 and also capable of rotating. Such a supporting structure achieves a structure supporting the shutter members 22 relative to the housing 12 so as to be capable of sliding and moving in the radial direction of the nozzle insertion passage 16 and also capable of rotating by a simple structure.

Figure 2:
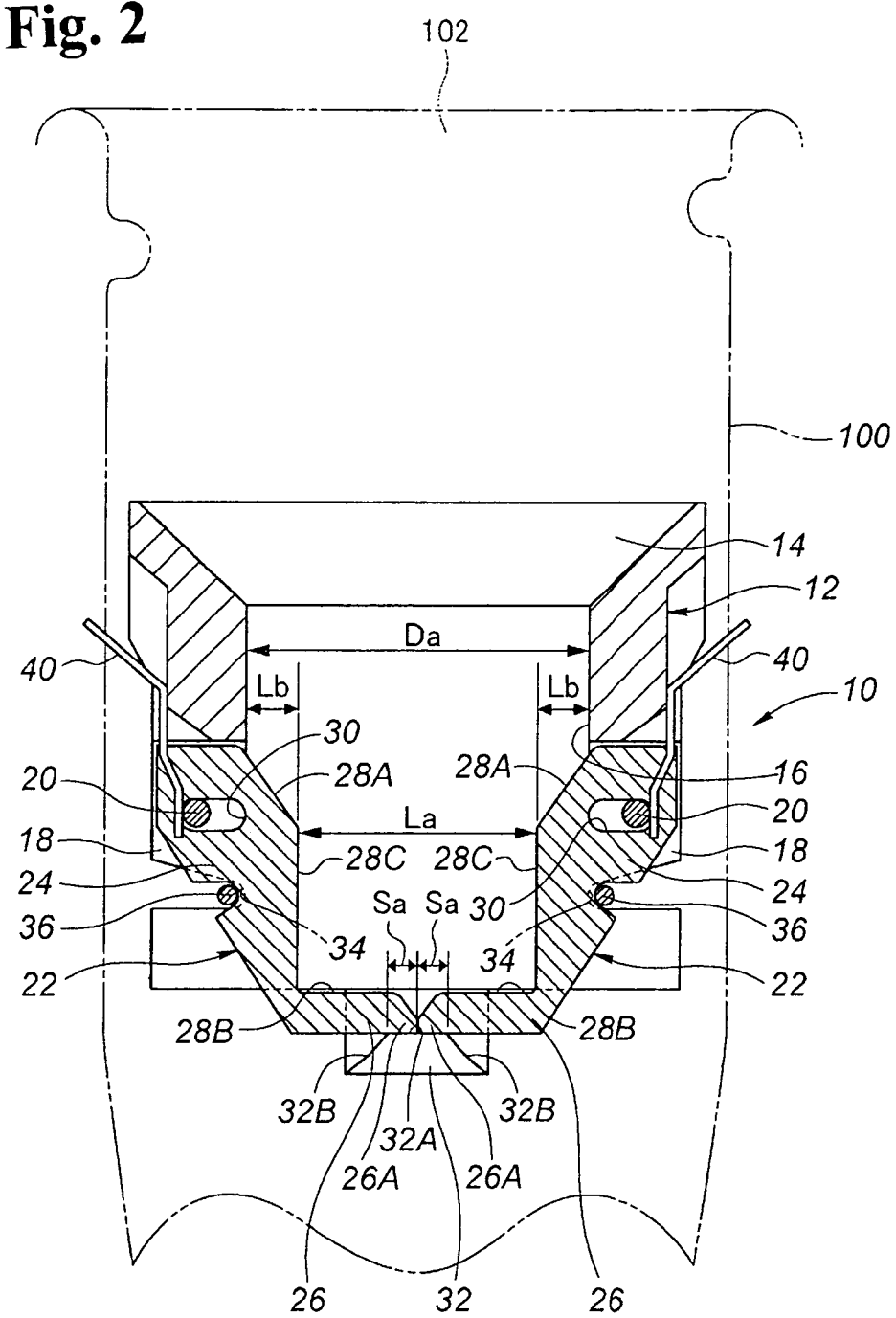
FIG. 2 is a vertical cross-sectional view of the device for preventing the fueling error according to the embodiment 1.
Figure 5:
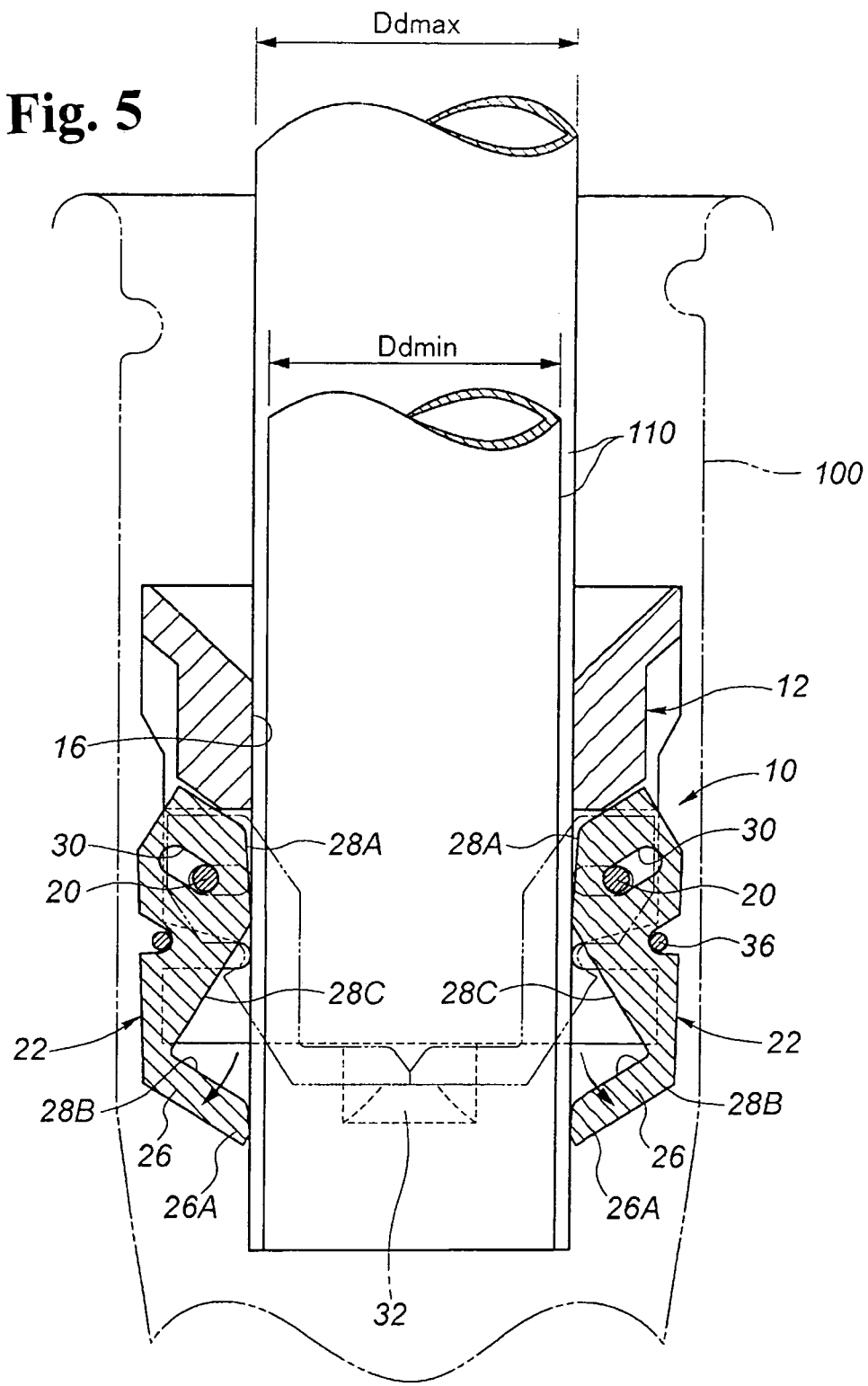
FIG. 5 is a vertical cross-sectional view showing a completion state at the time of the insertion of the large-diameter nozzle in the device for preventing the fueling error according to the embodiment 1.

Due to a sliding movement and a rotational movement in the radial direction of the nozzle insertion passage 16 relative to the housing 12 which are guided by the axis members 20 and the bearing bores 30, the right-and-left shutter members 22 move between the blocking position (nozzle entrance-preventing position) preventing an insertion of a nozzle relative to the nozzle insertion passage 16 by blocking the nozzle insertion passage 16 by the shielding portions 26 as shown in FIG. 2, and a permitting position permitting the nozzle to be inserted and passed through the nozzle insertion passage 16 by the shielding portions 26 which recede outwardly in the radial direction from the nozzle insertion passage 16 as shown in FIG. 5. Incidentally, in the explanation of the present embodiment, a rotation of the shutter members 22 in a direction where the shutter members 22 move to the permitting position is called the rotation in an opening direction.

Figure 3:
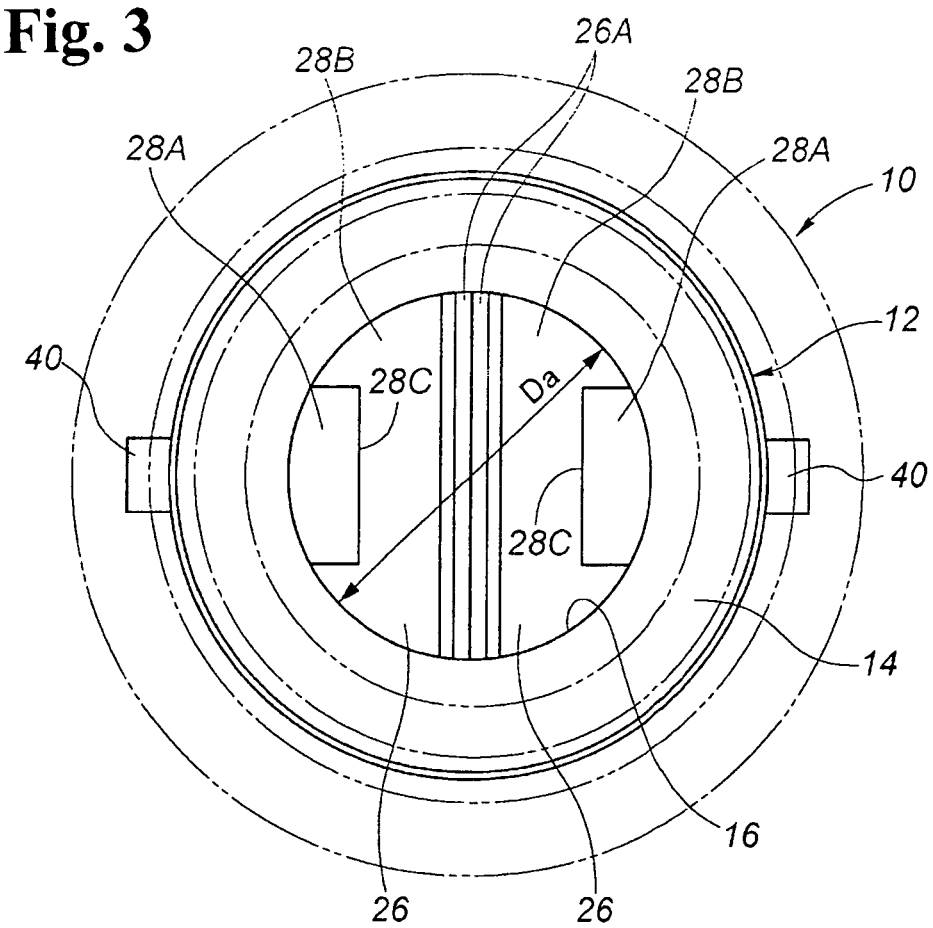
FIG. 3 is a plan view of the device for preventing the fueling error according to the embodiment 1.

In the blocking position of the approximately semicircular plate-like shielding portions 26 of the right-and-left shutter members 22, end portions 26A abut against each other, and compensate each other so as to form a circular plate and, as shown in FIGS. 1 to 3, completely shield the nozzle insertion passage 16.

In outside portions of the arm portions 24 of the right-and-left shutter members 22, grooves 34 are formed. On the grooves 34 of the right-and-left shutter members 22, C-shaped springs 36 by a wire are fitted in and placed in such a way as to surround the right-and-left shutter members 22. The C-shaped springs 36 bias the shutter members 22 by the springs toward the blocking position.

Thereby, in a steady state (at a time of non-insertion of the nozzle), the right-and-left shutter members 22 are positioned in the blocking position forcibly by a spring force of the C-shaped springs 36, and the shutter members 22 never unnecessarily wobble and move to a permitting position side.

Incidentally, spring means biasing the shutter members 22 toward the blocking position are not limited to the C-shaped springs 36, and may be ring-like springs surrounding an outside of the arm portions 24 of the right-and-left shutter members 22 and the like.

In the exit portion of the nozzle insertion passage 16 of the housing 12, a stirrup-like stopper portion 32 is integrally formed. The stopper portion 32 is located in a position striding across the end portions 26A of the shielding portions 26 of the right-and-left shutter members 22, and includes an upper surface portion 32A where a lower bottom surface of an end portion 26A side of the shielding portions 26 slidably engages in the radial direction of the nozzle insertion passage 16. In a state in which the end portion 26A side of the shielding portions 26 is engaged with the upper surface portion 32A, the shutter members 22 can only slide and move in the radial direction relative to the housing 12, and cannot rotate in the opening direction.

Thereby, the stopper portion 32 prohibits the rotation of the shutter members 22 in the opening direction up to the time when the shutter members 22 slide and move (slide crosswise) to an outside of the radial direction of the nozzle insertion passage 16 only for a predetermined amount Sa from the state of being in the blocking position. The predetermined amount Sa of the stopper portion 32 is determined by a length of the radial direction of the nozzle insertion passage 16 of the upper surface portion 32A of the stopper portion 32. On both end portions of the radial direction of the nozzle insertion passage 16 of the upper surface portion 32A, inclined surface portions 32B allowing the rotation of the shutter members 22 in which the axis members 20 are pivot axes, are continued.

The right-and-left shutter members 22 include first abutting portions 28A by inclined surfaces which project inwardly (a center side of the nozzle insertion passage 16) in the radial direction compared to a radial directional position corresponding to an inner circumferential surface of the nozzle insertion passage 16 and are inclined inwardly in the radial direction with a descending slope, on upper end sides of the arm portions 24, i.e., an entrance side of the nozzle insertion passage 16. The first abutting portions 28A are formed in the respective right-and-left shutter members 22. In a state in which the shutter members 22 are in the blocking position, the first abutting portions 28A oppositely project to the inside of the nozzle insertion passage 16 from an opening formed on a circumferential surface of the nozzle insertion passage 16. When the nozzle with a predetermined value or above is inserted into the nozzle insertion passage 16, it produces a component force in the radial direction to operate the shutter members 22 to slide and move outwardly in the radial direction.

The right-and-left shutter members 22 include second abutting portions 28B on a front side of a nozzle insertion direction relative to the nozzle insertion passage 16 from the first abutting portions 28A, i.e., on an exit side of the nozzle insertion passage 16. In the present embodiment, the second abutting portions 28B are constituted by upper surfaces of the shielding portions 26, and operate the shutter members 22 to rotate up to the permitting position by the abutment of the nozzle inserted into the nozzle insertion passage 16.

The right-and-left shutter members 22 include vertical surface portions 28C which are parallel to a central axis line of the nozzle insertion passage 16 between the first abutting portions 28A and the second abutting portions 28B in the state in the blocking position. The vertical surface portions 28C formed in the respective right-and-left shutter members 22 are opposed to each other in parallel.

Due to a positional relationship the nozzle insertion direction of the first abutting portions 28A and the second abutting portions 28B located across the vertical surface portions 28C, in a case in which the nozzle whose outside diameter is the predetermined value or above is inserted into the nozzle insertion passage 16, the nozzle abuts against the abutting portions 28A at first, and is further inserted from there, so that the nozzle abuts against the second abutting portions 28B.

Here, the dimension of each portion will be explained. As shown in FIG. 2, an inside diameter Da of the nozzle insertion passage 16 is slightly larger than a maximum nozzle bore diameter (outside diameter) Ddmax (refer to FIG. 4) of a large-diameter nozzle 110 which is included in a fueling gun for light oil. In the state in which the shutter members 22 are in the blocking position, a radial directional dimension (equal to the shortest radial directional dimension between the first abutting portions 28A of the right-and-left shutter members 22) La between the vertical surface portions 28C of the right-and-left shutter members 22 which are opposed to each other in the radial direction of the nozzle insertion passage 16, is nearly equal to or slightly smaller than a maximum nozzle bore diameter (outside diameter) Dgmin (refer to FIG. 8) of a small-diameter nozzle 120 which is included in a fueling gun for gasoline. Projecting dimensions Lb in the radial direction of the right-and-left first abutting portions 28 are set in a value larger than the predetermined amount Sa of the stopper portion 32, and may be Lb=(Da−La)/2, and Lb>(Da−Dgmin)/2+Sa.

Thereby, in a case when the large-diameter nozzle 110 enters into the nozzle insertion passage 16, both the right-and-left shutter members 22 slide and move for the predetermined amount Sa or above, and the end portions 26A of the shielding portions 26 are disengaged from an engagement with the upper surface portion 32A of the stopper portion 32. On the other hand, even if the small-diameter nozzle 120 enters into the nozzle insertion passage 16, both the right-and-left shutter member 22 never slide and move for the predetermined amount Sa or above, and even if the end portion 26A of one of the shielding portions 26 is disengaged from the engagement with the upper surface portion 32A of the stopper portion 32, the end portion 26A of the other shielding portion 26 is not disengaged from the engagement with the upper surface portion 32A of the stopper portion 32.

Incidentally, in a case when La+Sa is smaller than a minimum nozzle bore diameter (outside diameter) Ddmin (refer to FIG. 4) of the large-diameter nozzle 110, by abutment of the large-diameter nozzle 110 relative to the first abutting portions 28A, the shutter members 22 slightly rotate.

In order to allow static electricity of the fueling gun at a time of fueling to escape, surface portions of the shutter members 22 which are exposed to the nozzle insertion passage 16 may have conducting properties by attaching a metallic plate and the like. Also, by metallic earth plates 40 (refer to FIG. 2) attached to the housing 12, conductive portions of the shutter members 22 may be conductively connected to the metallic cap-type filler pipe 100. This earth function can be obtained by constituting the whole device including the shutter members 22 by conductive plastic without the earth plates 40.

Next, an operation for preventing the fueling error by the device for preventing the fueling error 10 of the present embodiment, will be explained.

Figure 4:
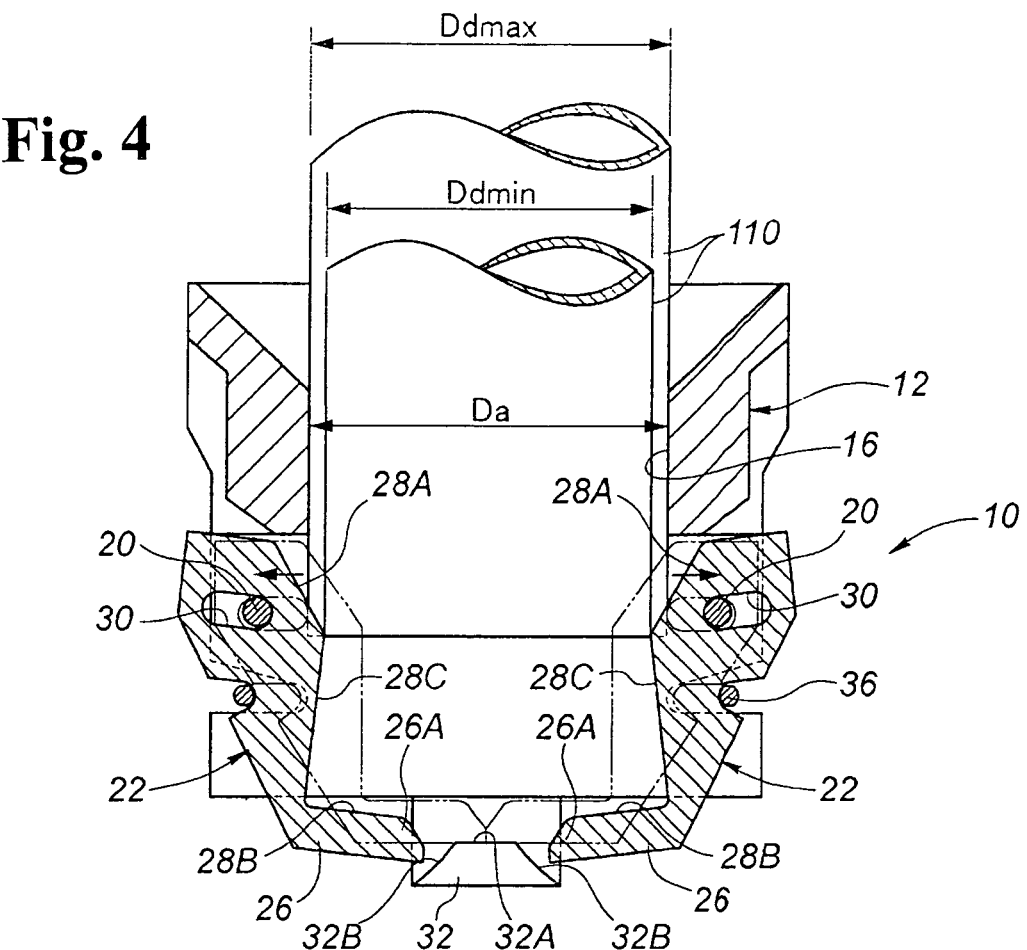
FIG. 4 is a vertical cross-sectional view showing an initial state at a time of an insertion of a large-diameter nozzle in the device for preventing the fueling error according to the embodiment 1.

In a state in which the right-and-left shutter members 22 are positioned in the blocking position of the nozzle entrance prevention, when the large-diameter nozzle 110 of the fueling gun for light oil whose outside diameter is the predetermined value or above is inserted into the nozzle insertion passage 16, as shown in FIG. 4, at first, an end of the large-diameter nozzle 110 abuts against the respective first abutting portions 28A of the right-and-left shutter members 22 approximately at the same time. Then, the nozzle is, further inserted from there, so that under the guidance of the engagement between the axis members 20 and the bearing bores 30 by the long bores, the right-and-left shutter members 22 slide and move to the outside of the radial direction of the nozzle insertion passage 16 in such a way as to be pushed open against the spring force of the C-shaped springs 36.

In a case of the large-diameter nozzle 110, even in the case of the large-diameter nozzle 110 with the minimum nozzle bore diameter Ddmin, the right-and-left shutter members 22 slide and move for the respective predetermined amount Sa or above, and the respective end portions 26A of the right-and-left shielding portions 26 are disengaged from the engagement with the upper surface portion 32A of the stopper portion 32. Thereby, the right-and-left shutter members 22 come to a state so as to be able to rotate in an expanding direction as a rotation center of the respective axis members 20.

By further inserting the large-diameter nozzle 110 from there, the end of the large-diameter nozzle 110 abuts against both the second abutting portions 28B of the right-and-left shutter members 22 approximately at the same time. Also, the second abutting portions 283 are pushed by the end of the large-diameter nozzle 110, so that both the right-and-left shutter members 22 rotate in the expanding direction as the rotation center of the respective axis members 20 in such a way as to be pushed open against the spring force of the C-shaped springs 36. Thereby, as shown in FIG. 5, the shielding portions recede outwardly in the radial direction from the nozzle insertion passage 16, so that both the right-and-left shutter members 22 are positioned in the permitting position permitting the nozzle to be inserted and passed through the nozzle insertion passage 16.

Thereby, the large-diameter nozzle 110 passes through disposed positions of the shielding portions 26, and can be inserted further to a back side so as to be positioned in a regular fueling position which can be fueled.

Figure 6:
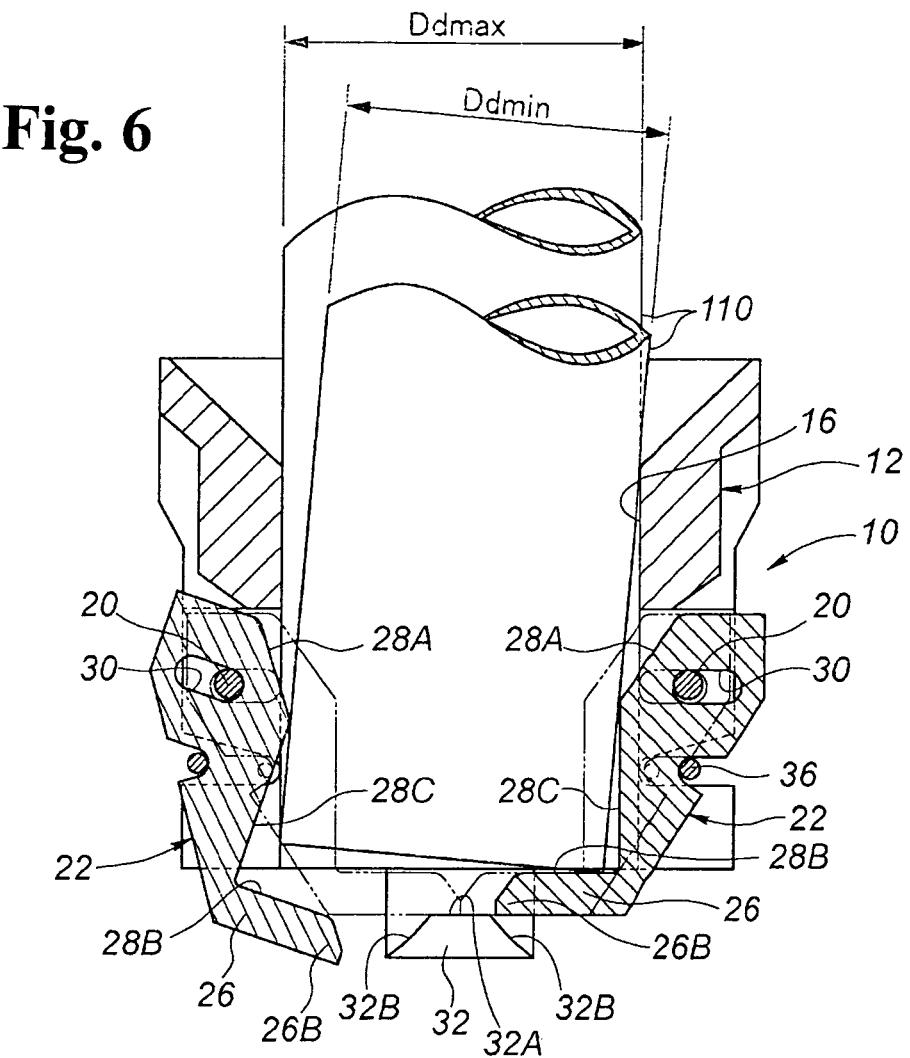
FIG. 6 is a vertical cross-sectional view showing a state at a time of an oblique insertion of the large-diameter nozzle in the device for preventing the fueling error according to the embodiment 1.
Figure 7:
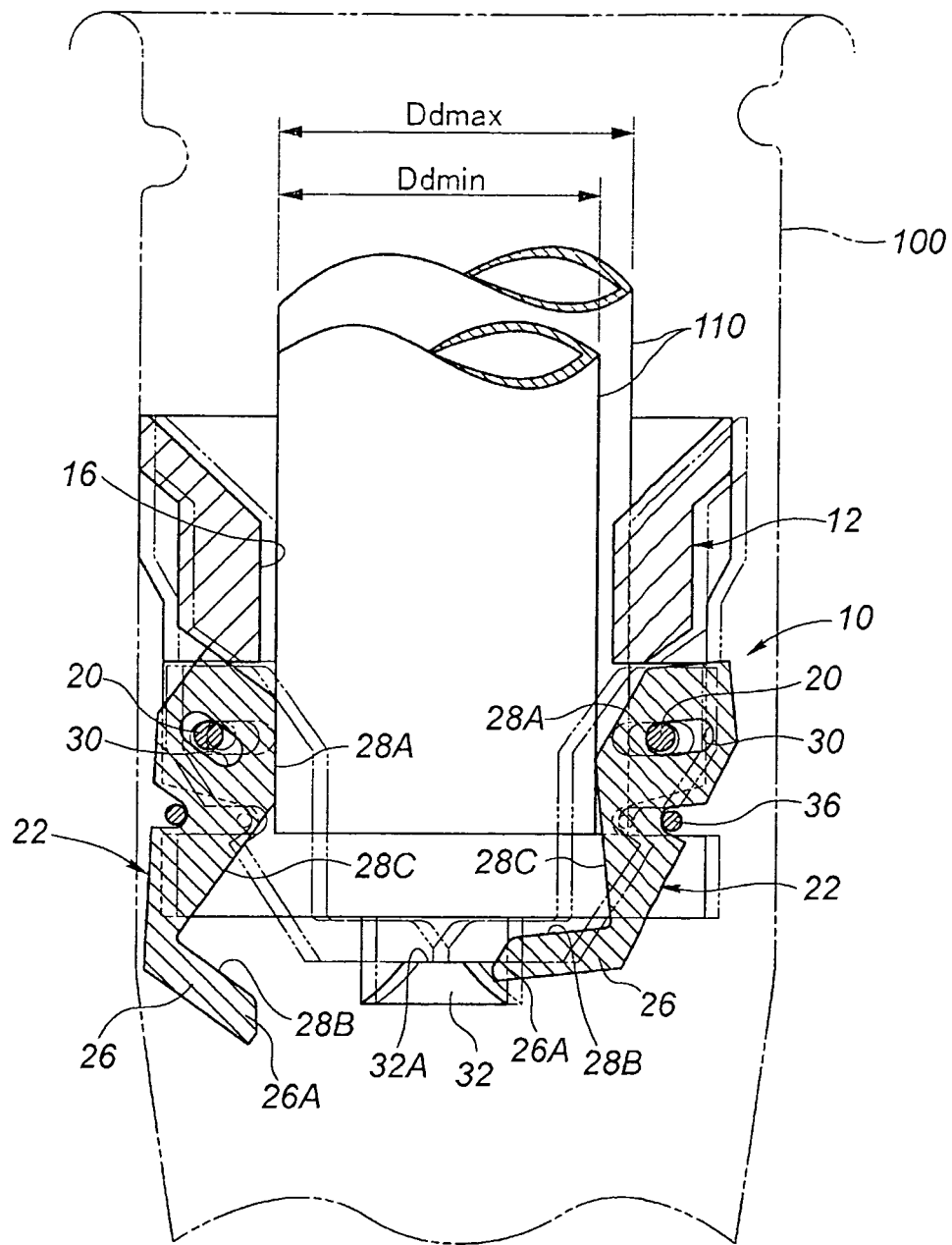
FIG. 7 is a vertical cross-sectional view showing a state at a time of an offset insertion of the large-diameter nozzle in the device for preventing the fueling error according to the embodiment 1.

In the case of the large-diameter nozzle 110, as shown in FIG. 6, even if the large-diameter nozzle 110 is inserted obliquely relative to the nozzle insertion passage 16, or as shown in FIG. 7, even if the large-diameter nozzle 110 is inserted relative to the nozzle insertion passage 16 in an offset state of being slanted to one side, due to correlations between the radial directional dimension La between the vertical surface portions 28C of the shutter members 22; the projecting dimensions Lb in the radial direction of the first abutting portions 28A; and the predetermined amounts Sa of the stopper portion 32, the end of the large-diameter nozzle 110 is assured to be abutted against both the first abutting portions 28A of the right-and-left shutter members 22 at the same time. Also, both the right-and-left shutter members 22 slide and move for the predetermined amount Sa or above, and the respective end portions 26A of the right-and-left shielding portions 26 are disengaged from the engagement with the upper surface portion 32A of the stopper portion 32. Then, the right-and-left shutter members 22 come to the state so as to be able to rotate in the expanding direction (opening direction) as the rotation center of the respective axis members 20.

Thereby, in the case of the large-diameter nozzle 110, even if the large-diameter nozzle 110 is inserted obliquely relative to the nozzle insertion passage 16, or inserted in the offset state, the right-and-left shutter members 22 rotate in the expanding direction as the rotation center of the respective axis members 20 in such a way as to be pushed open against the spring force of the C-shaped springs 36. Also, the shielding portions 26 recede outwardly in the radial direction from the nozzle insertion passage 16, so that the right-and-left shutter members 22 are positioned in the permitting position permitting the nozzle to be inserted and passed through the nozzle insertion passage 16. Thereby, even in those cases, the large-diameter nozzle 110 passes through the disposed positions of the shielding portions 26, and can be inserted further to the back side so as to be positioned in the regular fueling position which can be fueled.

When the large-diameter nozzle 110 is removed from the nozzle insertion passage 16, as shown in FIGS. 1 to 3, due to the spring force of the C-shaped springs 36, the right-and-left shutter members 22 return to the original blocking position, and the nozzle insertion passage 16 is completely shielded by the shielding portions 26. Thereby, entry of dust to the fuel tank at the time of the non-insertion of the nozzle, can be prevented.

Figure 8:
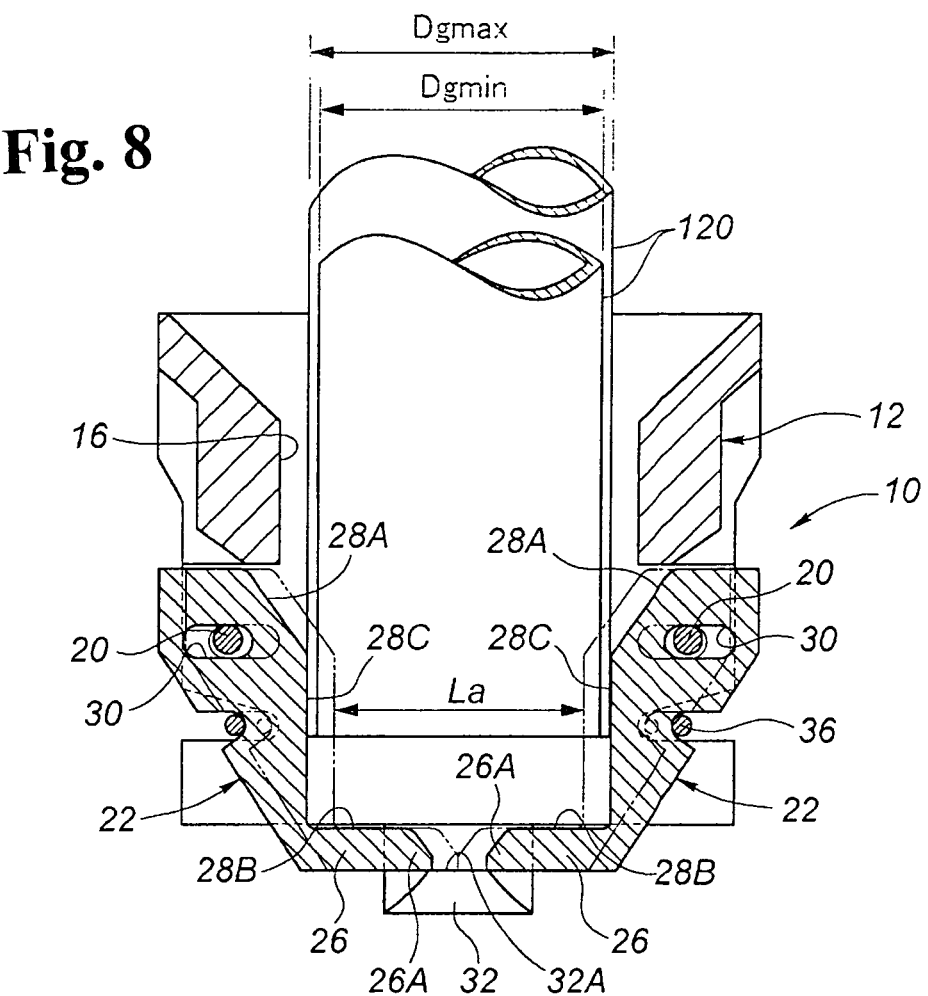
FIG. 8 is a vertical cross-sectional view showing a state at a time of the insertion of a small-diameter nozzle in the device for preventing the fueling error according to the embodiment 1.

In a case of the insertion of the small-diameter nozzle 120 for the fueling gun for gasoline whose nozzle outside diameter is less than the predetermined value, as shown in FIG. 8, an end of the small-diameter nozzle 120 abuts against the respective first abutting portions 28A of the right-and-left shutter members 22; and the nozzle is further inserted from there. Even if under the guidance of the engagement between the axis members 20 and the bearing bores 30 by the long bores, the right-and-left shutter members 22 are pushed open against the spring force of the C-shaped springs 36, and the small-diameter nozzle 120 has a diameter smaller than that of the large-diameter nozzle 110 even in a case of a maximum nozzle bore diameter Dgmax, so that the right-and-left shutter members 22 never slide and move for the respective predetermined amounts Sa or above.

Thereby, the end portions 26A of the right-and-left shielding portions 26 maintain the engagement with the upper surface portion 32A of the stopper portion 32, and the right-and-left shutter members 22 do not come to a state of being capable of rotating in the expanding direction as the rotation center of the respective axis members 20. Since the shutter members 22 do not rotate and move in the expanding direction, the end of the small-diameter nozzle 120 hits the shielding portions 26, so that the small-diameter nozzle 120 cannot be inserted to the back side further. For this reason, the small-diameter nozzle 120 is never positioned in the regular fueling position which can be fueled.

Figure 9:
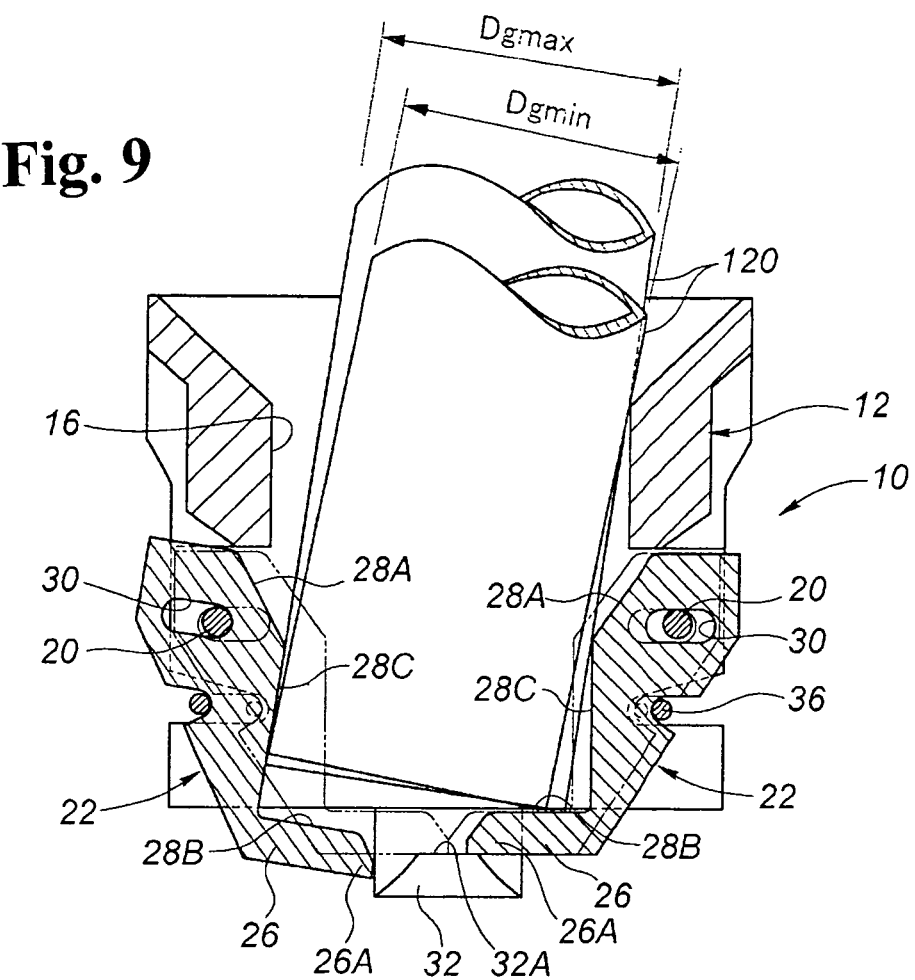
FIG. 9 is a vertical cross-sectional view showing a state at a time of the oblique insertion of the small-diameter nozzle in the device for preventing the fueling error according to the embodiment 1.
Figure 10:
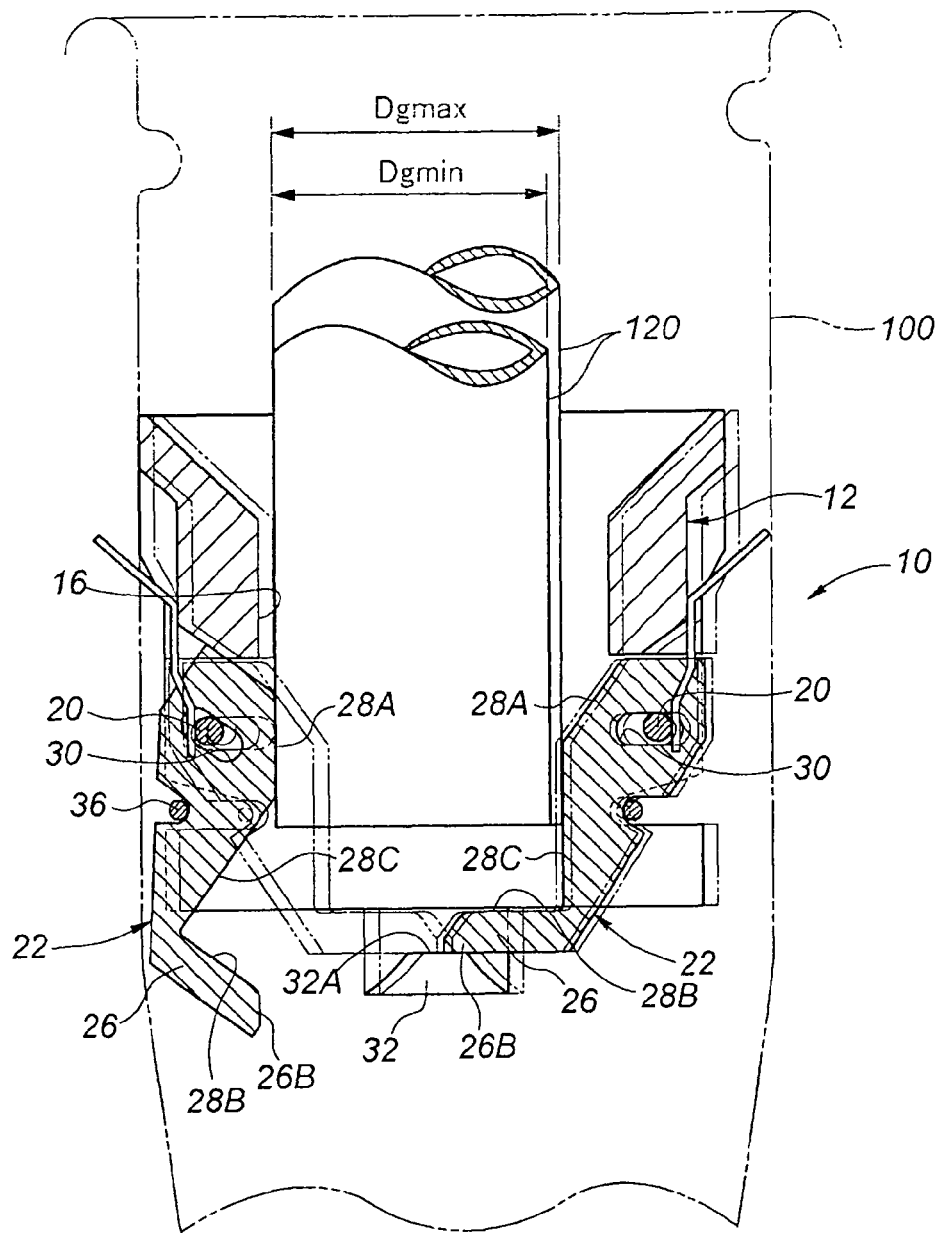
FIG. 10 is a vertical cross-sectional view showing a state at a time of the offset insertion of the small-diameter nozzle in the device for preventing the fueling error according to the embodiment 1.
Figure 11:
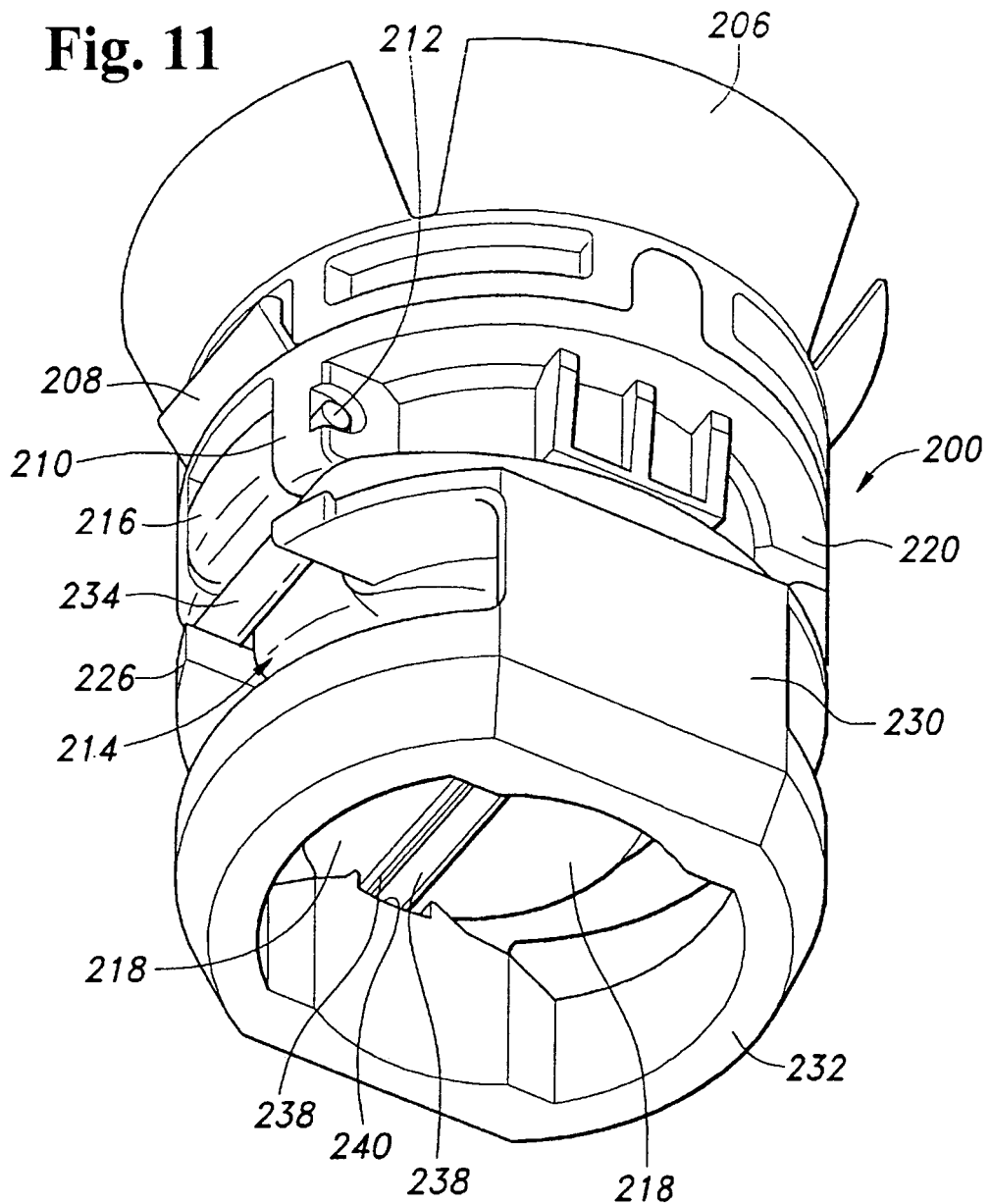
FIG. 11 is a perspective view showing an embodiment 2 of the device for preventing the fueling error according to the present invention.
Figure 12:
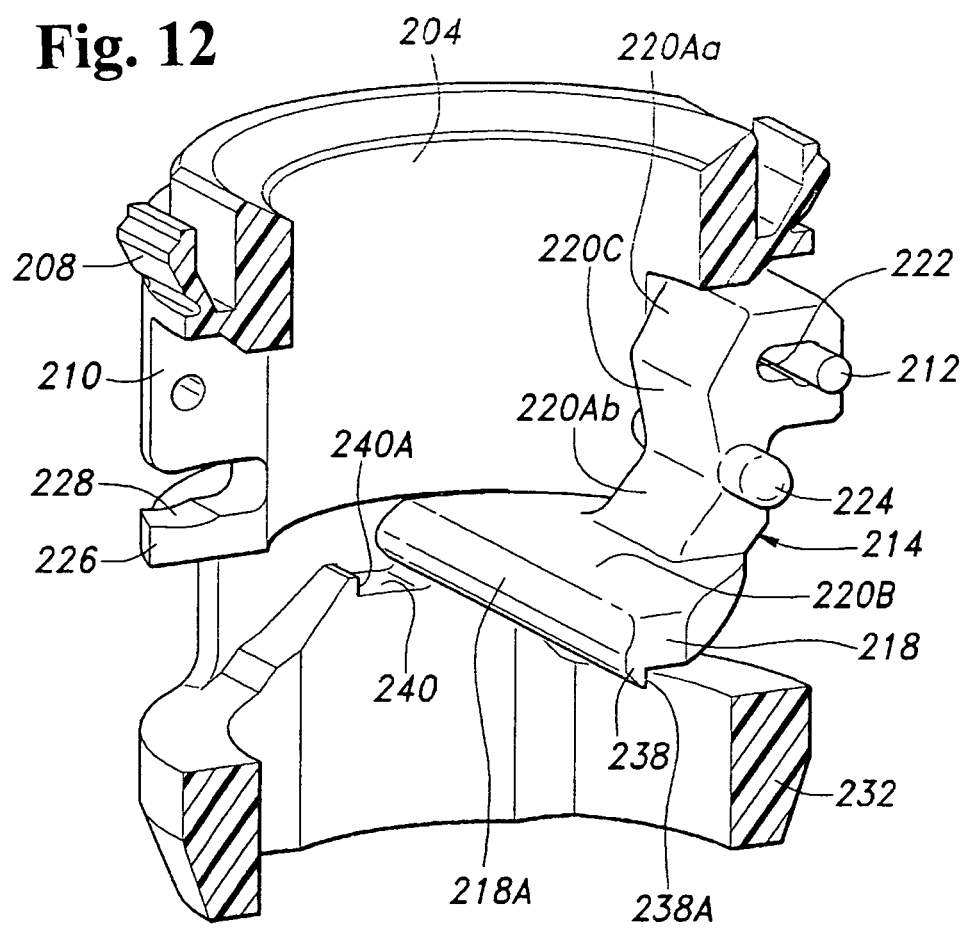
FIG. 12 is a perspective view wherein the device for preventing the fueling error according to the embodiment 2 is made in a cross-sectional surface.

In the case of the small-diameter nozzle 120, as shown in FIG. 9, in a case when the small-diameter nozzle 120 is inserted obliquely relative to the nozzle insertion passage 16, or as shown in FIG. 10, in a case when the small-diameter nozzle 120 is inserted relative to the nozzle insertion passage 16 in the offset state of being slanted to one side, due to the correlations among the radial directional dimension La between the vertical surface portions 28 of the above-mentioned shutter members 22; the projecting dimensions Lb in the radial direction of the first abutting portions 28A; and the predetermined amount Sa of the stopper portion 32, the end of the small-diameter nozzle 120 never abuts against both the first abutting portions 28A of the right-and-left shutter members 22 at the same time, and the end of the small-diameter nozzle 120 abuts against either one of the right-and-left first abutting portions 28A. Even if one of the shutter members 22 slides and moves for the predetermined amount Sa or above, the other shutter member 22 never slides and moves for the predetermined amount Sa or above.

Thereby, the end portion 26A of either of the right-and-left shielding portions 26 maintains the engagement with the upper surface portion 32A of the stopper portion 32, and one of the shutter members 22 does not rotate and move. Accordingly, the end of the small-diameter nozzle 120 hits one of the shielding portions 26, so that the small-diameter nozzle 120 cannot be inserted to the back side further. For this reason, even in those cases, the small-diameter nozzle 120 is never positioned in the regular fueling position which can be fueled.

Due to the above-mentioned operation, without blocking insertion of the large-diameter nozzle 110 whose entrance should be permitted, the insertion of the small-diameter nozzle 120 is accurately prevented, and an assured prevention of the fueling error is carried out.

Embodiment 2

An embodiment 2 of the device for preventing fueling error according to the present invention will be explained with reference to FIGS. 11 to 17.

A device 200 for preventing a fueling error of the present embodiment is disposed near the fuel opening 102 of the cap-type filler pipe 100 communicating with the fuel tank of the automobile. The device 200 for preventing the fueling error includes an approximately cylindrical housing 202 which is constituted by the synthetic resin molding product. The housing 202 is fixed and disposed near the fuel opening 102 of the cap-type filler pipe 10.0. A nozzle insertion passage 204 by the straight bore is formed so as to pass through in the up and down direction.

On an upper portion (entrance side of the nozzle insertion passage 204) of the housing 202, funnel-shaped nozzle guiding members 206 which guide the nozzle to the nozzle insertion passage 204 is attached by locking claws 208. On a lower portion (exit side of the nozzle insertion passage 204) of the housing 202, an approximately annular nozzle end supporting portion 232 is integrally provided by two leg portions 230 extended downwardly from a lower end of the housing 202.

On an outer circumference of the housing 202, two right-and-left bearing bracket portions 210 are formed on both right and left sides (180 degrees rotational displacement position) across a central portion of the nozzle insertion passage 204. The two right-and-left bearing bracket portions 210 respectively support axis members 212 on an axis line parallel to a radius line (tangent line) of the nozzle insertion passage 204. The right-and-left axis members 212 attached to the right-and-left bearing bracket portions 210 are extended mutually in parallel.

The housing supports a pair of right-and-left shutter members 214 by the right-and-left axis members 212 right-and-left shutter members 214 are the synthetic resin molding products with the mutually same shape, and symmetrically disposed on both the right and left sides across, the central portion of the nozzle insertion passage 204.

The right-and-left shutter members 214 include arm portions 216 extended in the same direction with the axis line direction (up and down direction) of the nozzle insertion passage 204, and approximately semicircular plate-like and approximately horizontal shielding portions 218 integrally formed in lower end portions of the arm portions 216. The shielding portions 218 are located in an exit portion (lower end portion) of the nozzle insertion passage 204, and extend inwardly in the radial direction of the nozzle insertion passage 204. On lower bottom surface sides of end portions 218A of the shielding portions 218, stopper engaging claw portions 238, which can be engaged with the after-mentioned stopper depressed portion 240, are formed so as to project downwardly. Incidentally, the above-mentioned arm portions 24 and shielding portions 26 are in the state as in the after-mentioned blocking position.

Near upper ends of the arm portions 216, bearing bores 222 by the long bores which are long in the radial direction of the nozzle insertion passage 204 are passed through and formed. In the bearing bores 222, the axis members 212 are passed through and engaged. Thereby, the right-and-left shutter members 214 are respectively supported from the housing 202 so as to be capable of sliding and moving in the radial direction of the nozzle insertion 214 and also capable of rotating.

On an outside end portion of the nozzle insertion passage 204, expanded groove portions 222A are formed in order for the shutter members 214 to be capable of rotating only for a small angle (about 1 to 3 degrees) as a center of the after-mentioned pin portions 224 in a state in which the shielding portions 218 are positioned in the after-mentioned blocking position.

In an intermediate portion of the up and down direction of the arm portions 216, the pin portions 224 are projected and formed. The pin portions 224 include the central axis line parallel to the central axis line of the axis members 212, and slidably and rotatably engage horizontal grooves 228 which are long in the radial direction of the nozzle insertion passage 204 defined by a lower surface portion of the bearing bracket portions 210 and an upper surface portion of a flange portion 226 projected and formed on the outer circumference of the housing 202.

Figure 13:
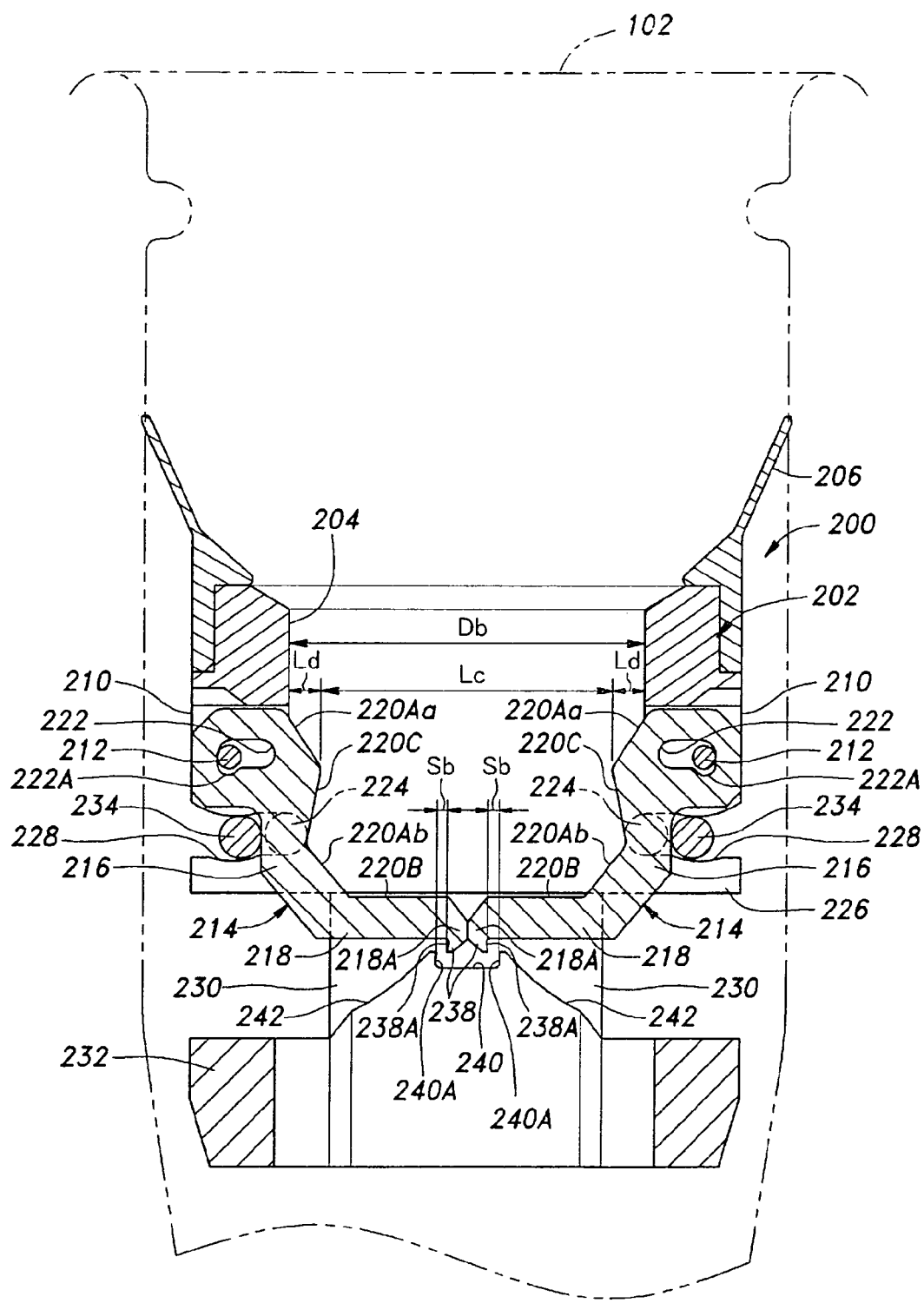
FIG. 13 is a vertical cross-sectional view of the device for preventing the fueling error according to the embodiment 2.
Figure 16:
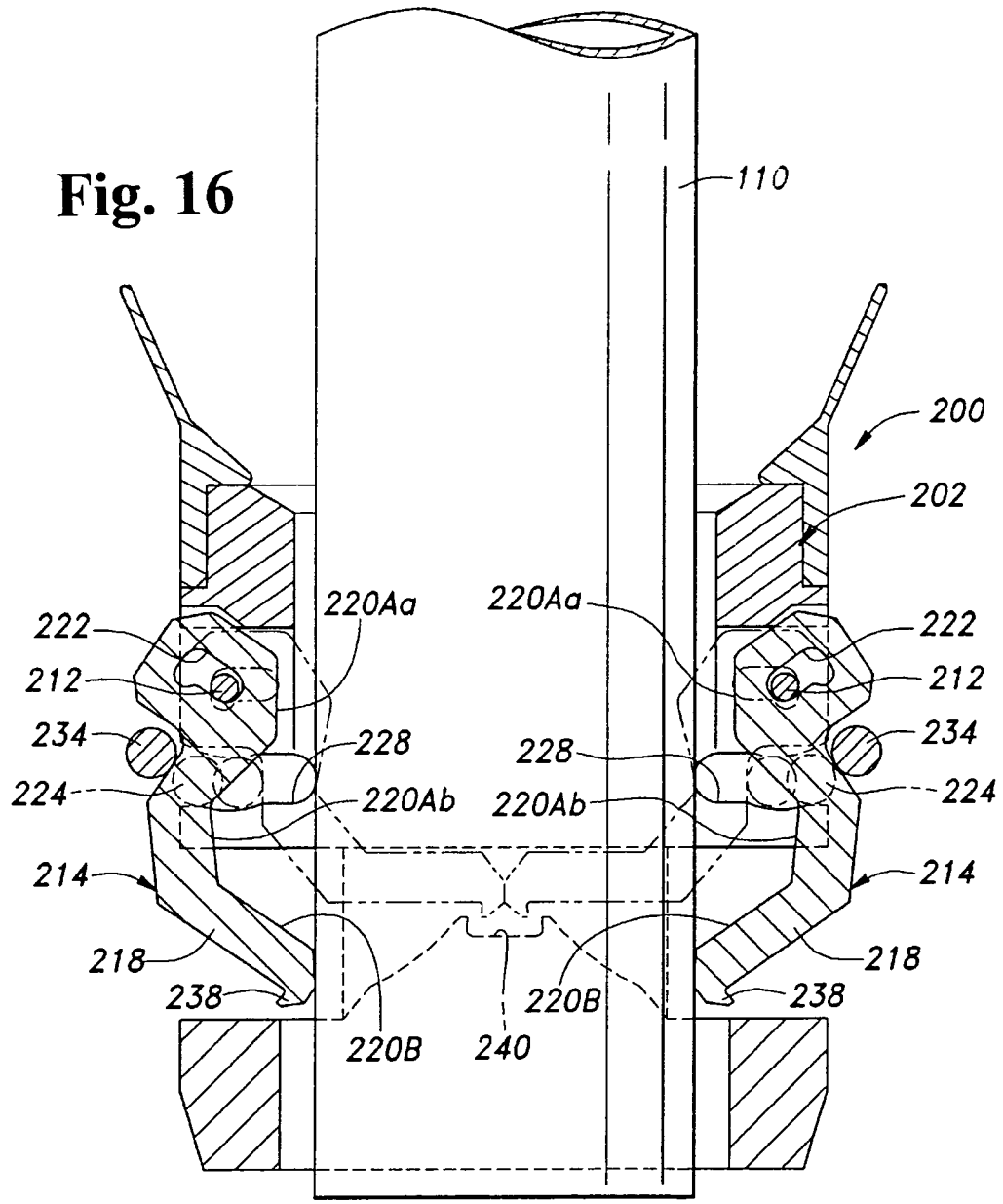
FIG. 16 is a vertical cross-sectional view showing the completion state at the time of the insertion of the large-diameter nozzle in the device for preventing the fueling error according to the embodiment 2.

Due to the sliding movement and the rotational movement in the radial direction of the nozzle insertion passage 204 of the shutter members 214 relative to the housing 202 which are guided by the axis members 212 and the bearing bores 222, the right-and-left shutter members 214 move between the blocking position (nozzle entrance-preventing position) preventing the insertion of the nozzle relative to the nozzle insertion passage 204 by blocking the nozzle insertion passage 204 by the shielding portions 218 as shown in FIG. 13, and the permitting position permitting the nozzle to be inserted and passed through the nozzle insertion passage 204 by the shielding portions 218 which recede outwardly in the radial direction from the nozzle insertion 204 as shown in FIG. 16. Incidentally, even in the present embodiment, the rotation of the shutter members 214 in the direction where the shutter members 214 move to the permitting position is called the rotation in the opening direction.

In the blocking position of the approximately semicircular plate-like shielding portions 218 of the right-and-left shutter members 214, the end portions 218A abut against each other and compensate each other so as to form the circular plate and completely shield the nozzle insertion passage 204.

On the outer circumference of the housing 202, ring-like springs 234 are attached in a form of being fitted into the horizontal grooves 228. The ring-like springs 234 surround the outside of the arm portions 216 of the right-and-left shutter members 214, and bias the right-and-left shutter members 214 by the springs toward the blocking position.

Thereby, in the steady state (at the time of the non-insertion of the nozzle), the right-and-left shutter members 214 are positioned in the blocking position forcibly by the spring force of the ring-like springs 234, and the shutter members 214 never unnecessarily wobble and move to the permitting position side.

The stopper depressed portion 240 is formed on an inside surface of the respective two leg portions 230 extended downwardly from the lower end of the housing 202. The stopper depressed portion 240 is a depressed groove with an upward opening and includes vertical barrier surfaces 240A on both right and left ends.

Before the stopper engaging claw portions 238 of the right-and-left shutter members 214 slide and move (slide crosswise) to the outside of the radial direction of the nozzle insertion passage 204 for predetermined amount Sb or above from the state in which the shutter members 214 are in the blocking position, in the case when the shutter members 214 rotate in the opening direction, barrier surfaces 238A of the stopper engaging claw portions 238 are engaged with the barrier surfaces 240A of the stopper depressed portion 240 so as to prohibit the sliding movement of the shutter members 214 to the outside of the radial direction. Thereby, the movement of the shutter members 214 to the permitting position is prevented.

If the shutter members 214 slide and move to the outside of the radial direction of the nozzle insertion passage 204 for the predetermined amount Sb or above from the state of being in the blocking position, even if the shutter members 214 rotate to the opening direction, the stopper engaging claw portions 238 never engage the stopper depressed portion 240, so that the shutter members 214 can be moved to the permitting position.

The predetermined amount Sb of the stopper portions by the stopper engaging claw portions 238 and the stopper depressed portion 240 is determined by a right and left width (length of the radial direction of the nozzle insertion passage 204) of the stopper depressed portion 240.

Incidentally, both sides of the radial direction of the nozzle insertion passage 204 of the stopper depressed portion 240 form inclined surface portions 242 allowing the rotation of the shutter members 214 in which the axis members 212 are the pivot axes.

The right-and-left shutter members 214 include topside first abutting portions 220Aa by inclined surfaces which project inwardly (the center side of the nozzle insertion passage 16) in the radial direction compared to the radial directional position matching an inner circumferential surface of the nozzle insertion passage 204 and are inclined inwardly in the radial direction with a descending slope, on upper end sides of the arm portions 216, i.e., the entrance side of the nozzle insertion passage 204. Also, the right-and-left shutter members 214 include downside first abutting portions 220Ab by inclined surfaces which are inclined inwardly in the radial direction with the descending slope, on lower end sides of the arm portions 216. The first abutting portions 220Aa, 220Ab are formed in the respective right-and-left shutter members 214. In a state in which the shutter members 214 are in the blocking position, the nozzle bore diameter, which oppositely projects to the inside of the nozzle insertion passage 204 and is inserted into the nozzle insertion passage 204, produces a component force in the radial direction by the abutment of the nozzle with the predetermined value or above so as to operate the shutter members 214 to slide and move outwardly in the radial direction.

The right-and-left shutter members 214 include second abutting portions 220B on the front side of the nozzle insertion direction relative to the nozzle insertion passage 204 from the topside first abutting portions 220Aa, i.e., on the exit side of the nozzle insertion passage 204. In the present embodiment, the second abutting portions 220B are constituted by upper surfaces of the shielding portions 218, and operate the shutter members 214 to rotate up to the permitting position by the abutment of the nozzle inserted into the nozzle insertion passage 204.

Abutting avoidance portions 220C, which are inclined to the outside of the direction of the nozzle insertion passage 204 with the descending slope, are formed between the first abutting portions 220Aa and 220Ab of the right-and-left shutter members 214. The abutting avoidance portions 220C are escape portions for avoiding, the unnecessary abutment against the nozzle which is inclined relative to the central axis line of the nozzle insertion passage 204 and inserted.

Due to a positional relationship of the nozzle insertion direction of the first abutting portions 220Aa, 220Ab and the second abutting portions 220B located across the abutting avoidance portions 220C, in a case in which the nozzle whose outside diameter is the predetermined value or above is inserted into the nozzle insertion passage 204, at first, the nozzle abuts against the topside first abutting portions 220Aa, next, abuts against the downside first abutting portions 220Ab, and is further inserted from there, so that the nozzle abuts against the second abutting portions 220B.

Here, the size of each portion will be explained. As shown in FIG. 13, an inside diameter Db of the nozzle insertion passage 204 is slightly larger than the maximum nozzle bore diameter (outside diameter) Ddmax (refer to FIG. 4) of the large-diameter nozzle 110 which is included in the fueling gun for light oil. In the state in which the shutter members 214 are in the blocking position, a shortest radial directional dimension Lc between the first abutting portions 220Aa of the right-and-left shutter members 214 which are opposed to each other in the radial direction of the nozzle insertion passage 204, is nearly equal to or slightly smaller than the maximum nozzle bore diameter (outside diameter) Dgmin (refer to FIG. 8) of the small-diameter nozzle 120 which is included in fueling gun for gasoline. Projecting dimensions in the radial direction of total of the right-and-left topside and downside first abutting portions 220Aa and 220Ab are set in a value larger than the predetermined amount Sb; projecting dimensions Ld in the radial direction of the first abutting portions 220Aa are set in a value larger than the predetermined amount Sb; and may be Lc=(Da−Ld)/2, and Lc>(Da−Dgmin)/2+Sb.

Thereby, in a case when the large-diameter nozzle 110 enters into the nozzle insertion passage 204, both the right-and-left shutter members 214 slide and move for the predetermined amount Sb or above, and are positioned in a position where both the right-and-left stopper engaging claw portions 238 do not engage the stopper depressed portion 240. On the other hand, in a case when the small-diameter nozzle 120 enters into the nozzle insertion passage 204, both the right-and-left shutter members 214 never slide and move for the predetermined amount Sb or above, and even if one of the stopper engaging claw portions 238 is positioned in the position which does not engage the stopper depressed portion 240, the rest of the stopper engaging claw portions 238 is in the position which engages the stopper depressed portion 240.

Next, an operation for preventing the fueling error by the device for preventing the fueling error 10 of the present embodiment, will be explained.

Figure 14:
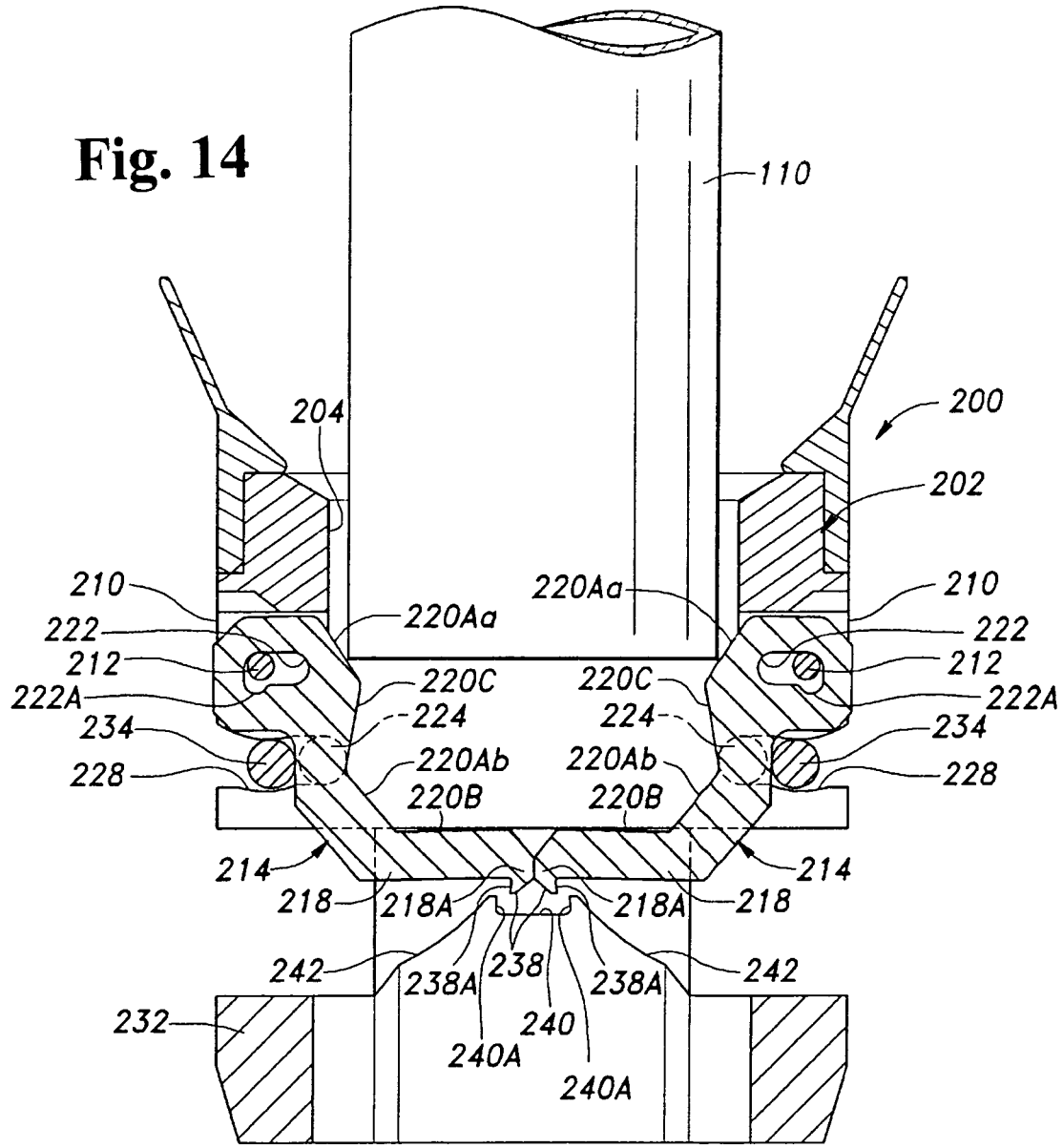
FIG. 14 is a vertical cross-sectional view showing the initial state at the time of the insertion of the large-diameter nozzle in the device for preventing the fueling error according to the embodiment 2.
Figure 15:
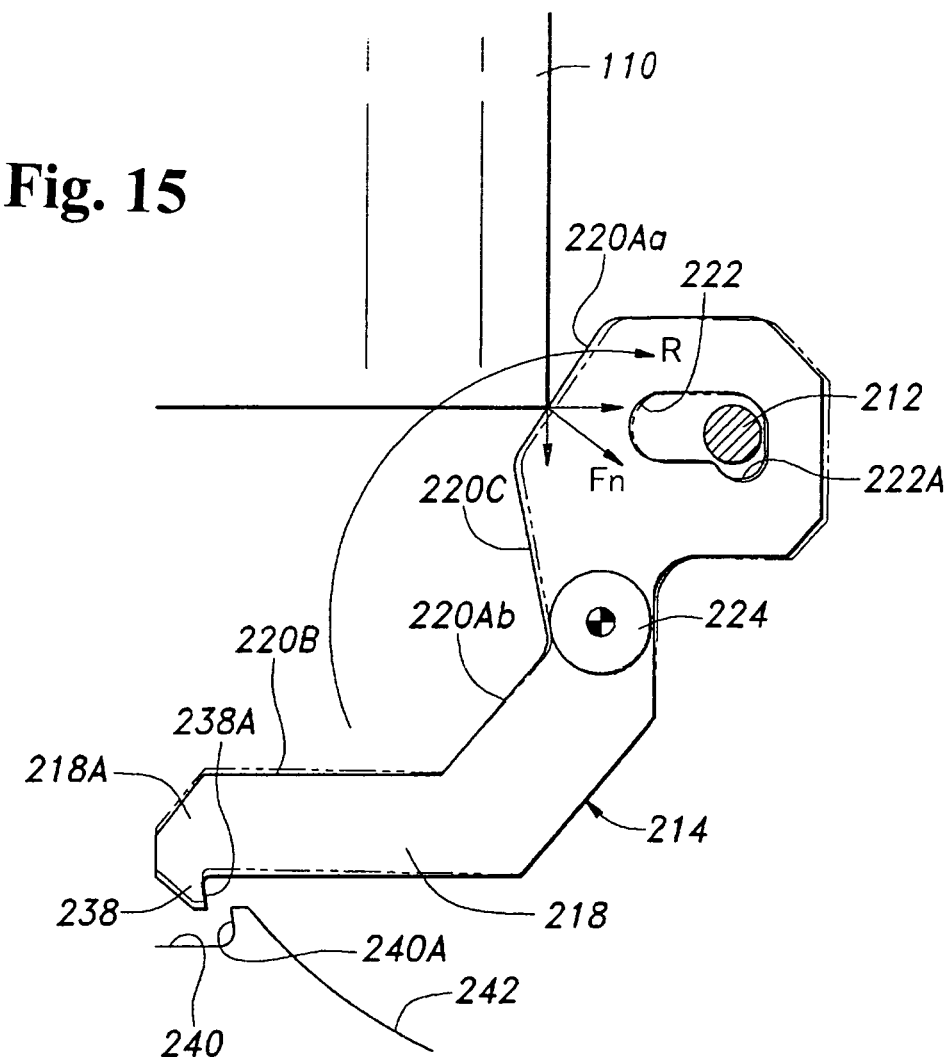
FIG. 15 is an enlarged view of essential parts showing the initial state at the time of the insertion of the large-diameter nozzle in the device for preventing the fueling error according to the embodiment 2.

In a state in which the right-and-left shutter members 214 are positioned in the nozzle entrance-preventing position, if the large-diameter nozzle 110 of the fueling gun for light oil whose nozzle outside diameter is the predetermined value or above is inserted into the nozzle insertion passage 204, as shown in FIG. 14, the end of the large-diameter nozzle 110 abuts against the respective topside first abutting portions 220Aa of the right-and-left shutter members 214 approximately at the same time.

Due to this abutment, a perpendicular normal component force Fn (refer to FIG. 15) relative to the first abutting portions 220Aa acts on the right-and-left shutter members 214. The shutter members 214 rotate in a closing direction R which is a direction opposite to the opening direction as a center of the pin portions 224 by the normal component force Fn only for the wobbling in the up and down direction between the axis members 212 and the nozzle insertion passage 204. Due to a rotation of this closing direction R, both the right-and-left stopper engaging claw portions 238 move in a direction of separating from the stopper depressed portion 240.

Thereby, in the forthcoming sliding movement of the shutter members 214, the stopper engaging claw portions 238 can be reliably prevented from being caught on the stopper depressed portion 240 by error.

Incidentally, the rotation of the above-mentioned shutter members 214 in the closing direction R is not necessary, and in the state in which the shutter members 214 are in the blocking position, if a gap dimension of the up and down direction between ends (lower ends of the barrier surfaces 238A) of the stopper engaging claw portions 238 and upper ends of the barrier surfaces 240A of the stopper depressed portion 240, is zero or above, the rotational movement of the shutter members 214 in the closing direction is not indispensable.

The nozzle is inserted further from this, so that both the first abutting portions 220Aa of the right-and-left shutter members 214 are pushed and subsequently, the end of the large diameter nozzle 110 abuts against the respective downside first abutting portions 220Ab of the right-and-left shutter members 214. Thereby, under the guidance of the engagement between the axis members 212 and the bearing bores 222 by the long bores, both the right-and-left shutter members 214 slide and move to the outside of the radial direction of the nozzle insertion passage 204 in such a way as to be pushed open against the spring force of the ring-like springs 234.

This sliding movement of the shutter members 214 does not necessarily have to be carried out after the rotation of the shutter members 214 in the closing direction R, and the shutter members 214 may slide and move accompanied by the rotation of the closing direction R.

In the case of the large-diameter nozzle 110, even in the case of the large-diameter nozzle 110 with the minimum nozzle bore diameter Ddmin, the right-and-left shutter members 214 slide and move for the respective predetermined amount Sb or above, and the stopper engaging claw portions 238 of the right-and-left shielding portions 218 are separated to the outside from the stopper depressed portion 240, so that the stopper engaging claw portions 238 are positioned in the position which does not engage the stopper depressed portion 240. Thereby, the right-and-left shutter members 214 come to a state so as to be able to rotate in the expanding direction (opening direction) as the rotation center of the respective axis members 212.

The large-diameter nozzle 110 is inserted further from this, so that the end of the large-diameter nozzle 110 abuts against both second abutting portion 220B of the right-and-left shutter members 214 approximately at the same time, and second abutting portions 220B are pushed by the end of the large-diameter nozzle 110. Accordingly, the right-and-left shutter members 214 rotate in the expanding direction in such a way as to be pushed open against the spring force of the ring-like springs 234 as the rotation center of the respective axis members 212. Thereby, as shown in FIG. 16, the shielding portions 218 recede outwardly in the radial direction from the nozzle insertion passage 204, so that both the right-and-left shutter members 214 are positioned in the permitting position permitting the nozzle to be inserted and passed through the nozzle insertion passage 204.

Thus, both the right-and-left shutter members 214 are positioned in the permitting position, so that the large-diameter nozzle 110 passes through the disposed positions of the shielding portions 218, and can be inserted further to the back side so as to be positioned in the regular fueling position which can be fueled. In the fueling position, an end side of the large-diameter nozzle 110 is entered into the nozzle end supporting portion 232 so as to prevent the large-diameter nozzle 110 from inclining widely.

In the case of the large-diameter nozzle 110, even if the large-diameter nozzle 110 is inserted obliquely relative to the nozzle insertion passage 204, or inserted relative to the nozzle insertion passage 204 in the offset state of being slanted to one side, due to correlations between the shortest radial directional dimension Lc among the right-and-left topside first abutting portions 220Aa; the projecting dimensions Ld in the radial direction of the first abutting portions 220Aa; and the predetermined amount Sb of the stopper portions, the end of the large-diameter nozzle 110 is assured to be abutted against both the first abutting portions 220Aa of the right-and-left shutter members 214 at the same time. Also, both the right-and-left shutter members 214 slide and move for the predetermined amount Sb or above, and the right-and-left stopper engaging claw portions 238 are positioned not to engage the stopper depressed portion 240, so that both the right-and-left shutter members 214 come to the state so as to be able to rotate in the expanding direction (opening direction) as the rotation center of the respective axis members 212.

Thereby, in the case of the large-diameter nozzle 110, even if the large-diameter nozzle 110 is inserted obliquely, relative to the nozzle insertion passage 204, or inserted in the offset state, the right-and-left shutter members 214 are positioned in the permitting position permitting the nozzle to be inserted and passed through. Thereby, even in those cases, the large-diameter nozzle 110 passes through the disposed positions of the shielding portions 218, and can be inserted further to the back side so as to be positioned in the regular fueling position which can be fueled.

When the large-diameter nozzle 110 is removed from the nozzle insertion passage 204, as shown in FIG. 13, due to the spring force of the ring-like springs 234, the right-and-left shutter members 214 move inversely and return to the original blocking position, and the nozzle insertion passage 204 is completely shielded by the shielding portions 218. Thereby, entry of dust to the fuel tank at the time of the non-insertion of the nozzle can be prevented.

Figure 17:
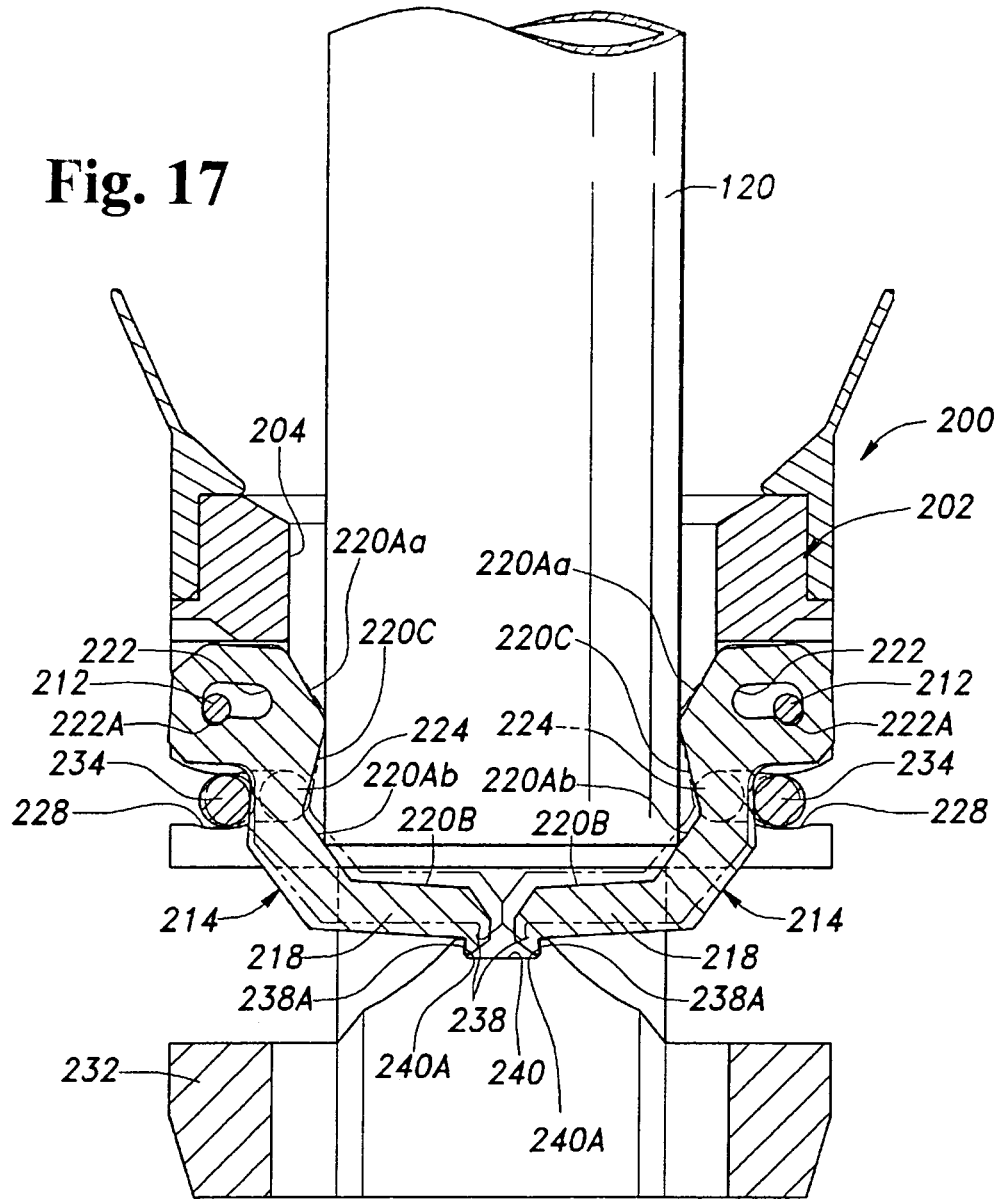
FIG. 17 is a vertical cross-sectional view showing the state at the time of the insertion of the small-diameter nozzle in the device for preventing the fueling error according to the embodiment 2.

In the case of insertion of the small-diameter nozzle 120 for the fueling gun for gasoline whose nozzle outside diameter is less than the predetermined value, as shown in FIG. 17, even if the end of the small-diameter nozzle 120 abuts against the topside first abutting portions 220Aa of the right-and-left shutter members 214, the right-and-left shutter members 214 never slide and move for the predetermined amount Sb or above, and before the right-and-left shutter members 214 slide and move only for the predetermined amount Sb, the end of the small-diameter nozzle 120 comes to abut against the downside first abutting portions 220Ab or second abutting portions 220B.

Thereby, the right-and-left shutter members 214 rotate in the opening direction as the center of the respective pin portions 224. This rotation is carried out accompanied by the movement of the axis members 212 in the expanded groove portions 222A. Due to this rotation, the stopper engaging claw portions 238 of the right-and-left shutter members 214 are engaged with the stopper depressed portion 240, so that the right-and-left shutter members 214 cannot slide and move to the outside of the radial direction of the nozzle insertion passage 204. The engagement between the stopper engaging claw portions 238 and the stopper depressed portion 240 is carried out strongly by the engagement between both the steep barrier surfaces 238A and 240A.

Due to this stopper engagement, the right-and-left shutter members 214 cannot rotate to the opening direction further, so that the movement to the permitting position is prevented. Thereby, the end of the small-diameter nozzle 120 remains in a state of hitting the second abutting portions 220, so that the small-diameter nozzle 120 cannot be inserted to the back side further. For this reason, the small-diameter nozzle 120 is never positioned in the regular fueling position which can be fueled.

In the case of the small-diameter nozzle 120, in the case when the small-diameter nozzle 12C is inserted obliquely relative to the nozzle insertion passage 204, or in the case when the small-diameter nozzle 120 is inserted relative, to the nozzle insertion passage 204 in the offset state of being slanted to one side, due to the above-mentioned correlations among the shortest radial directional dimension Lc between the right-and-left first abutting portions 220Aa; the projecting dimensions Ld in the radial direction of the first abutting portions 220Aa; and the predetermined amount Sb of the stopper portions, even if either one of the right-and-left shutter members 214 slides and moves for the predetermined amount Sb or above, the other shutter member 214 never slides and moves for the predetermined amount Sb or above, and the stopper engaging claw portion 238 of either of the right-and-left shutter members 214 engages the stopper depressed portion 240 so as to prevent either of the right-and-left shutter members 214 from moving to the permitting position. For this reason, even in those cases, the small-diameter nozzle 120 is never positioned in the regular fueling position which can be fueled.

Incidentally, the downside first abutting portions 220Ab of the present embodiment can be also operated as the abutting portions rotating the shutter members 214 by the abutment of the nozzle depending on a dimension setting.

Embodiment 3

Figure 18:
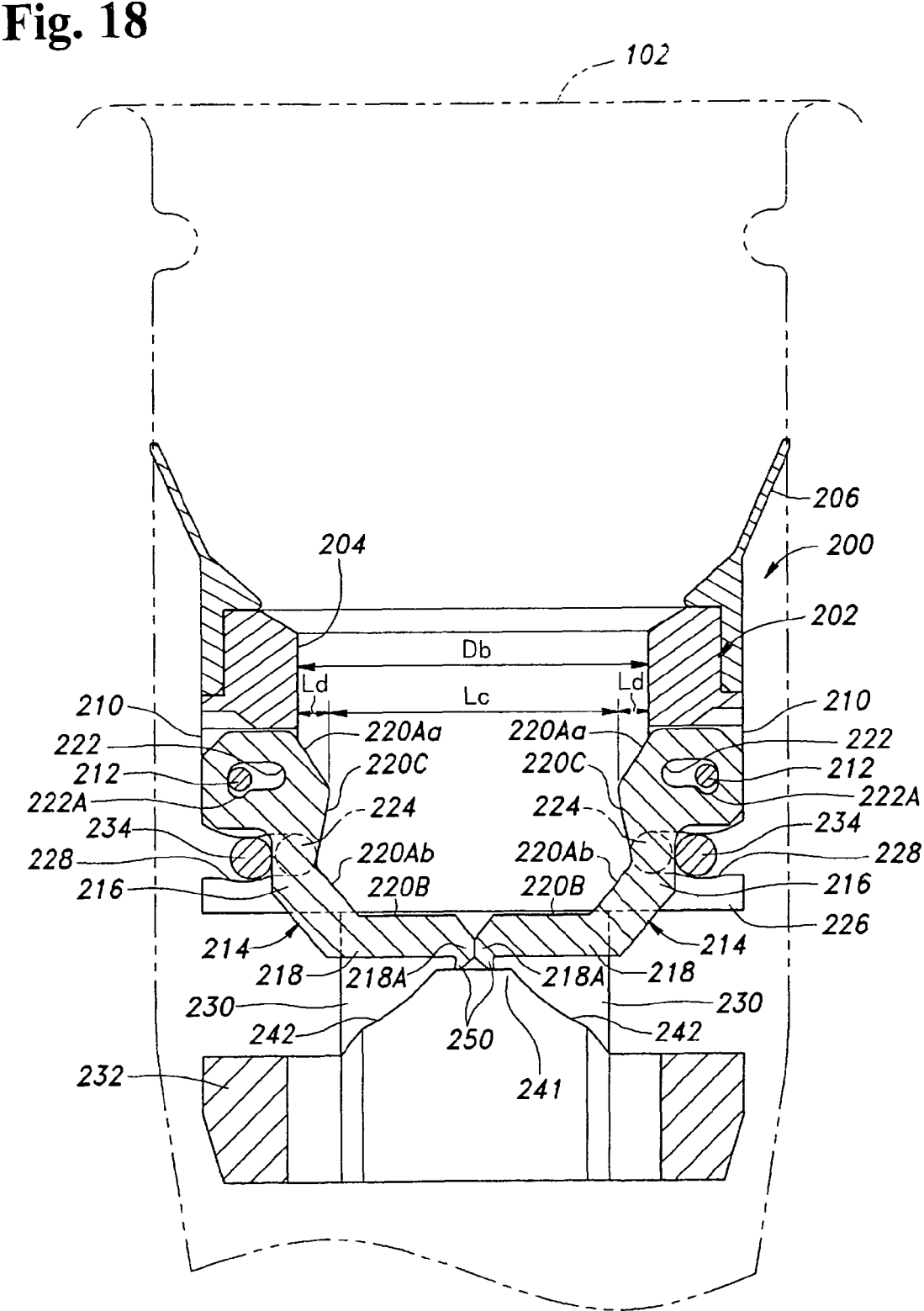
FIG. 18 is a vertical cross-sectional view showing an embodiment 3 of the device for preventing the fueling error according to the present invention.

An embodiment 3 of the device for preventing the fueling error according to the present invention will be explained with reference to FIG. 18. Incidentally, in FIG. 18, the same symbols are assigned to the corresponding parts shown in FIGS. 11 to 17, and their explanations are omitted.

In the present embodiment, in portions in which the shutter members 214 abut against a stopper portion 241, i.e., in the shielding portions 218, projecting portions 250 which plastically deform are integrally molded if a predetermined pressing load or above acts on the shutter members 214.

Here, the predetermined pressing load or above is a load in which a predetermined safety rate is predicted in a load in which the shutter members 214 are broken by the pressing load, i.e., a load assuring that the shutter members 214 will not break by the pressing load.

In the present embodiment, in a case when the small-diameter nozzle 120 is strongly pressed against the shutter members 214, the projecting portions 250 plastically deform. Thereby, even if the small-diameter nozzle 120 is strongly pressed against the shutter members 214, pressing energy thereof is absorbed by a plastic deformation of the projecting portions 250 so as to prevent the breakage of the shutter members 214 before it happens.

Figure 19:
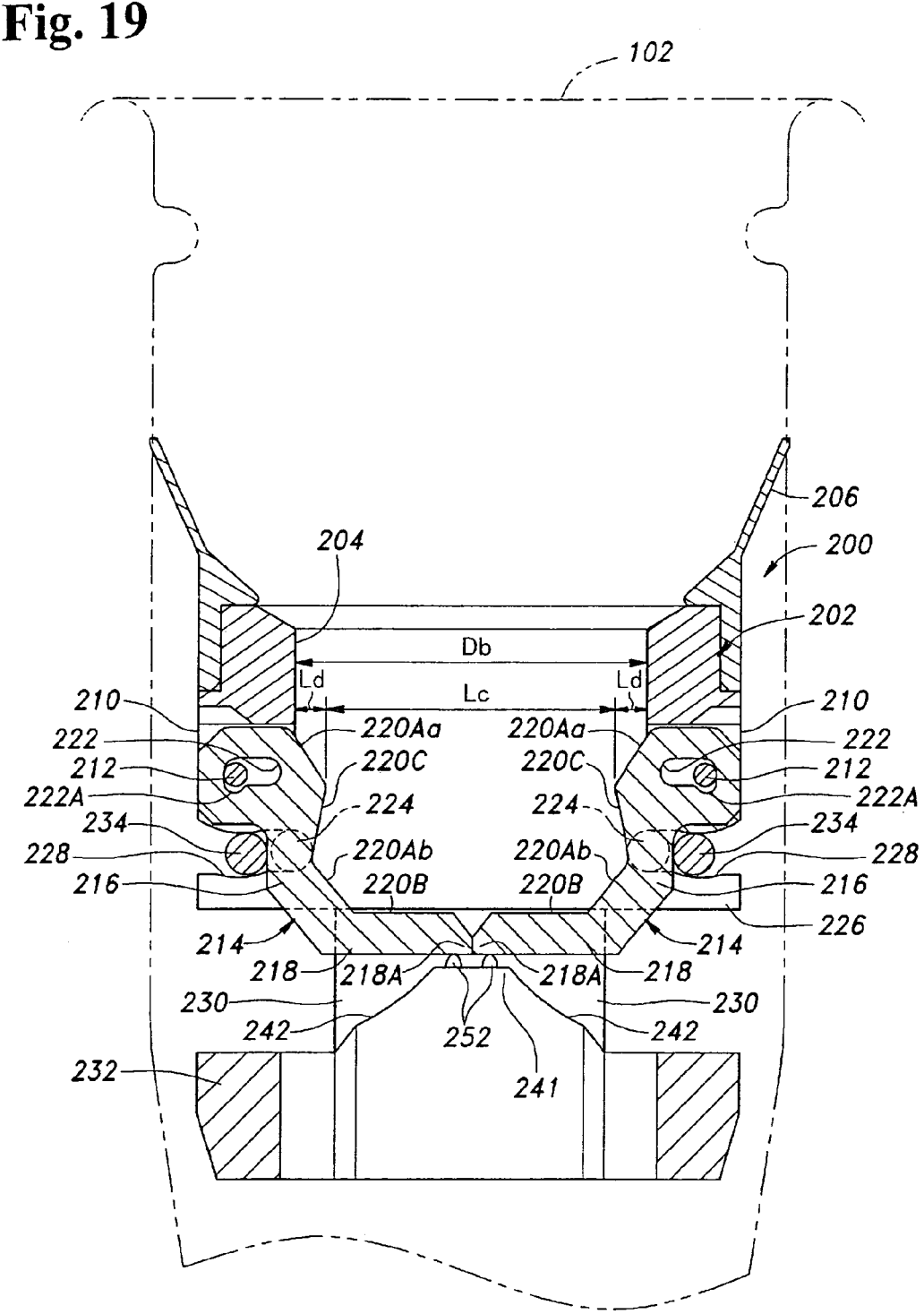
FIG. 19 is a vertical cross-sectional view showing a modified example of the device for preventing the fueling error according to the embodiment 3.

Incidentally, as shown in FIG. 19, this operation can be obtained in the same fashion even if projecting portions 252 equal to the projecting portions 250 are formed in the stopper portion 241.

The device for preventing the fueling error according to this embodiment 3 operates in the same fashion as in the embodiment 1 except for the above-mentioned operations, and provides the same effect as in the embodiment 1.

The device for preventing the fueling error according to the present invention is not limited to the fuel tank for the automobile, and can be applied to the prevention of the fueling error of various types of fuel cases such as a portable it tank and the like.

The disclosure of Japanese Patent Applications (No. 2008-215417 filed on Aug. 25, 2008 and No. 2008-332013 filed on Dec. 26, 2008) which are the basis of priorities of the present application under the Paris Convention is incorporated into the specification of the present application in their entirety by being referred herein. All the contents of the basic applications of claims for priorities of the present application under the Paris Convention and all the contents of the prior art cited in the present application are parts of the specification of the present application by being described therein.

EXPLANATION OF SYMBOLS 10 a device for preventing a fueling error
12 a housing
16 a nozzle insertion passage
20 an axis member
22 a shutter member
24 an arm portion
26 a shielding portion
28A a first abutting portion
28B a second abutting portion
28C a vertical surface portion
30 a bearing bore 32 a stopper portion
36 a C-shaped spring
100 a cap-type filler pipe
102 a fuel opening
110 a large-diameter nozzle
120 a small-diameter nozzle
200 a device for preventing a fueling error
202 a housing
204 a nozzle insertion passage
212 an axis member
214 a shutter member
218 a shielding portion
220A a first abutting portion
220B a second abutting portion
220C an abutting avoidance portion
222 a bearing bore
224 a pin portion.
228 a horizontal groove
238 a stopper engaging claw portion
240 a stopper depressed portion
241 a stopper portion
250, 252 projecting portions

What is claimed is:

1. A device for preventing a fueling error, which permits an insertion of a large-diameter nozzle relative to a nozzle insertion passage and blocks an insertion of a small-diameter nozzle relative to the nozzle insertion passage, the device comprising:
    axis members adapted to be attached to a housing member defining the nozzle insertion passage; and
    shutter members rotatably supported by the axis members and slidable in a radial direction of the nozzle insertion passage to move between a blocking position in which the shutter members block the insertion of the nozzle relative to the nozzle insertion passage, and a permitting position in which the shutter members permit the insertion of the nozzle relative to the nozzle insertion passage,
    wherein each of the shutter members includes
        a bearing bore elongated in the radial direction of the nozzle insertion passage to rotatably and slidably engage with the axis member,
        a first abutting portion having a predetermined bore diameter or above, and arranged to abut against the large diameter nozzle to slide in the radial direction of the nozzle insertion passage, and
        a second abutting portion extending sequentially from the first abutting portions in the nozzle insertion direction of the nozzle insertion passage, allowing-the shutter member to rotate up to the permitting position sequentially to an abutment of the nozzle to the first abutting portions, and
    the shutter members are configured so that when the nozzle in which the bore diameter is the predetermined value or above is inserted into the nozzle insertion passage, the nozzle abuts against the first abutting portions and the second abutting portions sequentially, so that after the shutter members slide along the axis members outwardly for a predetermined amount in the radial direction of the nozzle insertion passage, the shutter members rotate in an opening direction, and move from the blocking position to the permitting position.

2. A device for preventing a fueling error according to claim 1, further comprising a biasing device biasing the shutter members toward the blocking position.

3. A device for preventing a fueling error according to claim 1, further comprising a stopper portion disposed subsequent to the second abutting portions in the nozzle insertion direction, which prohibits a rotation of the shutter members in the opening direction until the shutter members slide and move outwardly in the radial direction of the nozzle insertion passage for a predetermined amount from the blocking position, and prevents movements of shielding portions of the shutter members to the permitting position.

4. A device for preventing a fueling error according to claim 3, wherein abutting portions between the shutter members and the stopper portion are provided with projecting portions which plastically deform by a predetermined pressing load or above.

5. A device for preventing a fueling error according to claim 1, further comprising a stopper portion disposed subsequent to the second abutting portions in the nozzle insertion direction, which prohibits sliding of the shutter members when the shutter members rotate in the opening direction without sliding outwardly in the radial direction of the nozzle insertion passage from the blocking position, and prevents the shutter members from moving to the permitting position.

6. A device for preventing a fueling error according to claim 5, wherein the stopper portion is formed in the shutter members and a member supporting the shutter members, and is structured by a locking portion with a barrier surface mutually engaging each other to prevent sliding of the shutter members.

7. A device for preventing a fueling error according to claim 5, wherein the shutter members are provided rotatably in a closing direction which is a direction opposite to the opening direction in the blocking position, and, due to abutment between the nozzle in which the bore diameter is the predetermined value or above and the first abutting portions, carry out rotation in the closing direction and sliding outwardly in the radial direction of the nozzle insertion passage.

8. A device for preventing a fueling error according to claim 1, wherein the shutter members include abutting avoidance portions which recede outwardly in the radial direction of the nozzle insertion passage so as to avoid inclined abutment against the nozzle which is inserted obliquely relative to a central axis line of the nozzle insertion passage.

9. A device for preventing a fueling error according to claim 1, wherein the two shutter members are symmetrically disposed on two sides across a central portion of the nozzle insertion passage.

10. A device for preventing a fueling error according to claim 1, wherein each of the shutter members includes an arm portion extending along the nozzle insertion passage and having the first abutting portion and the bearing bore, and a shielding portion formed below the arm portion and extending toward a center axis of the nozzle insertion passage, the shielding portion including the second abutting portion.

11. A device for preventing a fueling error according to claim 10, further comprising an urging member between the first and second abutting portions to urge the shutter members toward the center axis of the nozzle insertion passage.

12. A device for preventing a fueling error according to claim 11, further comprising a stopper disposed below the arm portions to prohibit sliding of the shutter members when the shutter members rotate in the opening direction without sliding outwardly in the radial direction of the nozzle insertion passage from the blocking position, and preventing the shutter members from moving to the permitting position.

13. A device for preventing a fueling error according to claim 12, wherein each of the shielding portions further comprises a stopper engaging claw portion projecting downwardly, and
    the stopper further comprises a stopper depressed portion having a depressed groove with an upward opening relative to the nozzle insertion direction to engage with the stopper engaging claw portions to prohibit sliding of the shutter members in the blocking position.

14. A device for preventing a fueling error according to claim 13, wherein each of the arm portions further comprises a projecting portion projecting downwardly to abut against the stopper so that when the small-diameter nozzle is strongly pressed against the shutter members, the projecting portion is deformed to absorb a pressing energy and prevent breakage of the shutter members.

* * * * *